US008156040B2

(12) United States Patent
Gavin et al.

(10) Patent No.: US 8,156,040 B2
(45) Date of Patent: Apr. 10, 2012

(54) METHOD AND SYSTEM FOR CONDUCTING INTERNATIONAL ELECTRONIC FINANCIAL TRANSACTIONS

(75) Inventors: Peter John Gavin, Richfield, MN (US); Sandra Lynn Hamlin, Plymouth, MN (US); Dianna Marie Weidenaar, Elk River, MN (US); Thomas H. Wick, Brooklyn Park, MN (US); Vicki Anderson, Miami, FL (US); Henrik Parl, Hørsholm (DK); Søren Rose, Lynge (DK); Annelise Lysdal, Glostrup (DK); Uwe Holmsgaard, Hillerød (DK)

(73) Assignee: Federal Reserve Bank of Minneapolis, Minneapolis, MN (US)

( * ) Notice: Subject to any disclaimer, the term of this patent is extended or adjusted under 35 U.S.C. 154(b) by 2014 days.

(21) Appl. No.: 10/868,729

(22) Filed: Jun. 15, 2004

(65) Prior Publication Data
US 2005/0004872 A1 Jan. 6, 2005

Related U.S. Application Data

(60) Provisional application No. 60/484,958, filed on Jul. 3, 2003.

(51) Int. Cl.
*G06Q 40/00* (2006.01)
(52) U.S. Cl. .......................................... 705/39; 705/35
(58) Field of Classification Search ................ 705/35, 705/38, 39
See application file for complete search history.

(56) References Cited

U.S. PATENT DOCUMENTS

| 4,270,042 A | 5/1981 | Case |
| 4,727,243 A | 2/1988 | Savar ............................ 235/379 |
| 4,823,264 A | 4/1989 | Deming ........................ 364/408 |
| 5,121,945 A | 6/1992 | Thomas |
| 5,175,682 A | 12/1992 | Higashiyama et al. |
| 5,448,043 A | 9/1995 | Nakano et al. |
| 5,532,464 A | 7/1996 | Josephson et al. ............ 235/379 |
| 5,691,524 A | 11/1997 | Josephson |
| 5,717,868 A | 2/1998 | James ............................ 395/235 |
| 5,742,819 A | 4/1998 | Caccavale |
| 5,761,510 A | 6/1998 | Smith et al. |
| 5,783,808 A | 7/1998 | Josephson |
| 5,787,402 A | 7/1998 | Potter et al. |

(Continued)

FOREIGN PATENT DOCUMENTS
WO      WO0030053      5/2000

OTHER PUBLICATIONS
60416663.*

(Continued)

*Primary Examiner* — Lalita Hamilton
(74) *Attorney, Agent, or Firm* — King & Spalding

(57) ABSTRACT

Converting electronic files comprising financial transaction data for supporting international electronic financial transactions. A gateway financial institution that processes electronic payments can organize files comprising international financial transactions according to the destination country. The gateway financial institution can transmit the organized transaction files to an interface that is coupled to the computing systems of foreign financial institutions. The interface can convert the transaction files from the format of the originating financial institution to the format of the receiving financial institution. The converted transaction files can then be forwarded to the respective foreign financial institutions. The interface can also transmit additional data associated with the transaction files to support settlement of the transactions.

35 Claims, 45 Drawing Sheets

U.S. PATENT DOCUMENTS

| | | |
|---|---|---|
| 5,790,778 A | 8/1998 | Bush et al. |
| 5,794,234 A | 8/1998 | Church et al. ............... 707/4 |
| 5,825,003 A | 10/1998 | Jennings et al. |
| 5,848,400 A | 12/1998 | Chang ............... 705/35 |
| 5,852,812 A | 12/1998 | Reeder |
| 5,940,813 A | 8/1999 | Hutchings |
| 5,946,669 A | 8/1999 | Polk ............... 705/40 |
| 5,956,700 A | 9/1999 | Landry |
| 5,963,647 A | 10/1999 | Downing et al. |
| 5,963,648 A | 10/1999 | Rosen |
| 5,978,485 A | 11/1999 | Rosen |
| 6,026,379 A | 2/2000 | Haller et al. ............... 705/34 |
| 6,032,133 A | 2/2000 | Hilt et al. ............... 705/40 |
| 6,061,665 A | 5/2000 | Bahreman ............... 705/40 |
| 6,076,064 A | 6/2000 | Rose |
| 6,076,074 A | 6/2000 | Cotton et al. ............... 705/40 |
| 6,098,053 A | 8/2000 | Slater ............... 705/44 |
| 6,119,107 A | 9/2000 | Polk ............... 705/40 |
| 6,141,651 A | 10/2000 | Riley et al. ............... 705/35 |
| 6,173,272 B1 | 1/2001 | Thomas et al. ............... 705/42 |
| 6,205,433 B1 | 3/2001 | Boesch et al. |
| 6,216,115 B1 | 4/2001 | Barrameda et al. |
| 6,243,689 B1 | 6/2001 | Norton |
| 6,246,999 B1 | 6/2001 | Riley et al. ............... 705/30 |
| 6,269,345 B1 | 7/2001 | Riboud |
| 6,304,860 B1 | 10/2001 | Martin, Jr. et al. ............... 705/43 |
| 6,317,745 B1 | 11/2001 | Thomas et al. ............... 707/100 |
| 6,408,284 B1 | 6/2002 | Hilt et al. |
| 6,598,028 B1 | 7/2003 | Sullivan et al. |
| 6,615,258 B1 | 9/2003 | Barry |
| 6,629,081 B1 | 9/2003 | Cornelius et al. |
| 6,721,715 B2 | 4/2004 | Nemzow |
| 6,754,640 B2 | 6/2004 | Bozeman |
| 6,829,590 B1 | 12/2004 | Greener et al. |
| 6,856,970 B1 * | 2/2005 | Campbell et al. ............... 705/35 |
| 6,868,408 B1 | 3/2005 | Rosen |
| 6,873,972 B1 | 3/2005 | Marcial et al. |
| 6,892,184 B1 | 5/2005 | Komem |
| 2001/0034682 A1 | 10/2001 | Knight et al. |
| 2002/0016769 A1 | 2/2002 | Barbara et al. ............... 705/40 |
| 2002/0029194 A1 | 3/2002 | Lewis et al. |
| 2002/0032642 A1 | 3/2002 | Chichilnisky ............... 705/37 |
| 2002/0035561 A1 | 3/2002 | Archer et al. |
| 2002/0038305 A1 | 3/2002 | Bahl et al. ............... 707/100 |
| 2002/0055904 A1 * | 5/2002 | Mon ............... 705/38 |
| 2002/0072942 A1 | 6/2002 | Kuykendall et al. |
| 2002/0077971 A1 | 6/2002 | Allred |
| 2002/0082962 A1 | 6/2002 | Farris et al. |
| 2002/0087455 A1 | 7/2002 | Tsagarakis et al. |
| 2002/0099656 A1 | 7/2002 | Poh Wong |
| 2002/0120537 A1 | 8/2002 | Morea |
| 2002/0120846 A1 | 8/2002 | Stewart et al. |
| 2002/0161692 A1 | 10/2002 | Loh et al. |
| 2002/0161707 A1 | 10/2002 | Cole |
| 2002/0185529 A1 | 12/2002 | Cooper et al. |
| 2003/0018554 A1 | 1/2003 | Lyftogt et al. |
| 2003/0024979 A1 | 2/2003 | Hansen et al. |
| 2003/0033228 A1 | 2/2003 | Bosworth-Davies et al. |
| 2003/0050892 A1 | 3/2003 | Clynes |
| 2003/0055756 A1 | 3/2003 | Allan |
| 2003/0065594 A1 | 4/2003 | Murphy |
| 2003/0065941 A1 | 4/2003 | Ballard |
| 2003/0070080 A1 | 4/2003 | Rosen |
| 2003/0105710 A1 | 6/2003 | Barbara et al. ............... 705/39 |
| 2003/0126094 A1 | 7/2003 | Fisher et al. |
| 2003/0144942 A1 | 7/2003 | Sobek ............... 705/36 |
| 2003/0158811 A1 | 8/2003 | Sanders et al. ............... 705/39 |
| 2003/0167223 A1 | 9/2003 | Pledereder et al. ............... 705/37 |
| 2003/0167237 A1 | 9/2003 | Degen et al. |
| 2003/0177087 A1 | 9/2003 | Lawrence |
| 2003/0182227 A1 | 9/2003 | Guzman ............... 705/39 |
| 2003/0187783 A1 | 10/2003 | Arthus et al. |
| 2003/0187792 A1 | 10/2003 | Hansen et al. |
| 2003/0208439 A1 | 11/2003 | Rast ............... 705/38 |
| 2003/0208440 A1 | 11/2003 | Harada et al. ............... 705/39 |
| 2003/0208445 A1 | 11/2003 | Compiano |
| 2003/0220878 A1 | 11/2003 | Degen et al. |
| 2003/0229586 A1 | 12/2003 | Repak ............... 705/39 |
| 2003/0233319 A1 | 12/2003 | Lawrence ............... 705/39 |
| 2004/0002914 A1 * | 1/2004 | Munro ............... 705/38 |
| 2004/0006533 A1 | 1/2004 | Lawrence |
| 2004/0024709 A1 | 2/2004 | Yu et al. |
| 2004/0093305 A1 | 5/2004 | Knight et al. ............... 705/40 |
| 2004/0109596 A1 | 6/2004 | Doran |
| 2004/0117299 A1 | 6/2004 | Algiene et al. |
| 2004/0128240 A1 | 7/2004 | Yusin ............... 705/39 |
| 2004/0138973 A1 | 7/2004 | Keis et al. |
| 2004/0143621 A1 | 7/2004 | Fredrickson et al. |
| 2004/0148255 A1 | 7/2004 | Beck et al. |
| 2004/0153403 A1 | 8/2004 | Sadre ............... 705/39 |
| 2004/0199463 A1 | 10/2004 | Deggendorf |
| 2004/0205011 A1 | 10/2004 | Northington et al. ............... 705/35 |
| 2004/0236646 A1 | 11/2004 | Wu et al. |
| 2005/0004872 A1 | 1/2005 | Gavin et al. |
| 2005/0021454 A1 | 1/2005 | Karpovich et al. |
| 2005/0044043 A1 | 2/2005 | Gooding et al. |
| 2005/0086136 A1 | 4/2005 | Love et al. |
| 2005/0167481 A1 | 8/2005 | Hansen et al. |
| 2005/0177464 A1 | 8/2005 | Komem et al. |
| 2005/0209961 A1 | 9/2005 | Michelsen et al. |

OTHER PUBLICATIONS

2002 ACH Rules, A Complete Guide to Rules & Regulations Governing the ACH Network, National Automated Clearing House Association, Copyright 2002. Attached pages: 1) Understanding the ACH Network: An ACH Primer, pp. 1-17; 2) Operating Rules of the National Automated Clearing House Association, Article Eight, pp. 28-29; 3) Operating Guidlines of the National Automated Clearing House Association: Section II, Chapter III, pp. 40-45; and Section IV, Chapter VI, pp. 120-140; and 4) Federal Reserve Bank Uniform Operating Circular [No. 4] on Automated Clearing House Items, Jun. 25, 2001.

ACH Goes Across the Border, South Florida Banking Institute, Vicki Anderson, Retail Payments Office, Federal Reserve System, Oct. 29, 2001.

Eurogiro, Development of Interface Between FED and Eurogiro, Request for Proposal, Jan. 14, 2003, Uwe Holmsgaard, Eurogiro Network A/S.

FedACH$^{SM}$ Product Development Discussion, Federal Reserve Financial Services, U.S. Bank, Nov. 30, 2001.

International ACH—Expanding the Gateway Concept Beyond Canada, Vicki Anderson, Retail Payments Office, Federal Reserve System, Apr. 15, 2002.

International Direct Deposit Overview, Electronic Payments, EROC, Federal Reserve Bank of New York, Oct. 9, 2002.

International Direct Deposit Technical Walkthru, Prepared for IRPPO, Oct. 9, 2002.

Overview, Federal Reserve and Check to ACH Conversion (CTAC), Presented to SWACHA—The Electronic Payments Resource, Jul. 31, 2002.

Overview of the Federal Reserve System's Check to ACH Conversion (CTAC) Product, Presented Feb. 15, 2002.

The Federal Reserve & Check-to-ACH Conversion, NACHA Electronic Check Conference, Sep. 23-24, 2002, Terry Roth, Retail Payments Office of the Federal Reserve System.

William B. Nelson, ACH News From Europe, Payments Journal, Jan./Feb. 2002.

Fedline User Guide, ACH, Version 2.4, Mar. 2002, including Fedline User Guide, Host Communications, Version 2.4, Jun. 1997.

PC AIMS User's Guide, Credit Controls, pp. 10-1 to 10-8, Feb. 25, 2002.

EPN Voice Response System (RALPH), Applicants submit that this document was published prior to Sep. 30, 2003.

NACHA Rule Amendment for Third-Party Service Providers: A Case Study, Chris Daniel, Partner, Alston & Bird LLP.

The Impact of NACHA Rule Changes on Third Party Service Providers, Dec. 15, 2004, Deborah Shaw, Senior Director of Network Services, NACHA.

NACHA Third Party ACH Rules: Improving Risk Management for Financial Institutions, Dec. 15, 2004, Mary O'Toole, Vice President, Bank of America.

* cited by examiner

Forward Payment - File Format Description for SWIFT to NACHA Conversion

FIGURE 9A - SWIFT Basic Header

|   | BH Tag | Field Name | Content / Options |
|---|---|---|---|
| M |   | Application Identifier | F |
| M |   | Data Unit | 01 |
| M |   | Receiver address (BIC) | 12a |
| M |   | Dummy | 0000 |
| M |   | Output Sequence Number | 6!n |

FIGURE 9B - SWIFT Application Header

|   | AH Tag | Field Name | Content / Options |
|---|---|---|---|
| M |   | Output Identifier | O |
| M |   | Message Type | 103 |
| M |   | Input time (from sender) | 4n |
| M |   | MIR<br>Input date<br>Senders address (BIC)<br>Dummy<br>Input sequence number | <br>6n<br>12a<br>0000<br>6n |
| M |   | Output date | 6n |
| M |   | Output time (receiver's local) | 4n |
| M |   | Message priority | ('N'\|'U') |

FIGURE 9C - SWIFT User Header

|   | UH Tag | Field Name | Content / Options |
|---|---|---|---|
| M | 108 | Reference Number | 16x |
| M | 901 | Currency Code | 'USD' |
| M | 902 | Value Date | 6n |
| M | 903 | Product Code | '20' |
| M | 904 | SHA / BEN / OUR Specification | 'OUR' |

FIGURE 9D - SWIFT Text Block

|     | TB Tag | Field Name | Content / Options |
| --- | --- | --- | --- |
| M | 20 | Senders reference number | 16x |
| M | 23B | Bank Operation Code | 'CRED' |
| O | 23E | Instruction Code | 'CORT' |
| NA | 26T | Transaction Type Code | 3!a |
| M | 32A | Value Date/ Currency Code /Interbank Settled Amount | 6!n'USD'15d |
| M | 33B | Currency and Original Ordered amount | 3!a15d |
| M | 36 | Exchange rate | 12d |
| M | 50K | Ordering Customer | 4*35x |
| O | 52A | Ordering Institution | 6!a2!c |
| O | 53A | Sender's correspondent (BIC) | 6!a2!c |
| NA | 54A | Receivers correspondent (BIC) | 6!a2!c |
| M | 57D | Account With Institution | 35x |
| M | 59 | Beneficiary Customer | [/34x]<br>4*35x |
| O | 70 | Remittance Information, Details of payment | 4*35x |
| M | 71A | Details of Charges | 3!a |
| O | 71F | Sender's Charges | 3!a15d |
| O | 71G | Receiver's Charges | 3!a15d |
| NA | 72 | Sender to Receiver Information | 6*35x |

FIGURE 9E - SWIFT Trailer

|     | TR Tag | Field Name | Content / Options |
| --- | --- | --- | --- |
| M | NOM | Number of Messages | 5n |
| M | TOT | Total of Amounts | 18no |
| M | PDF | Possible Duplicate File | ('0'|'1') |
| O | PDE | Possible Duplicate Emission | 6n |
| M | MAC | Message Authentication Code | 8h |

FIGURE 9F - FedACH NACHA Description

All Entries File Header Record – SWIFT to NACHA
O = Optional, M = Mandatory, NA = Not applicable, R = Required

| FHR Field No | Req | Length | Description | Contents | Values from Eurogiro |
|---|---|---|---|---|---|
| 1 | M | 1 | Record type code | '1' | '1' |
| 2 | R | 2 | Priority code | '01' | '01' |
| 3 | M | 10 | Immediate destination | bTTTTAAAAC | ABA # of FED, fixed value supplied by FED |
| 4 | M | 10 | Immediate origin | bTTTTAAAAC | ABA # of EGO |
| 5 | M | 6 | File creation date | YYMMDD | Input Date |
| 6 | O | 4 | File creation time | HHMM | Input Time |
| 7 | M | 1 | File ID modifier | A-Z, 0-9 | Per EGO, starting each day with A |
| 8 | M | 3 | Record size | '094' | '094' |
| 9 | M | 2 | Blocking factor | '10' | '10' |
| 10 | M | 1 | Format code | '1' | '1' |
| 11 | O | 23 | Immediate destination name | Alphanumeric | Blank |
| 12 | O | 23 | Immediate origin name | Alphanumeric | Blank |
| 13 | O | 8 | Reference code | Alphanumeric | Country code + ISN number |

FIGURE 9G - CBR/PBR Batch Header Record – SWIFT to NACHA

| CBR/PBR BHR Field No | Req | Length | Description | Contents | Values from Eurogiro |
|---|---|---|---|---|---|
| 1 | M | 1 | Record type code | '5' | '5' |
| 2 | M | 3 | Service class code | Numeric | '220' (credit only transfer) |
| 3 | M | 16 | Company name | Alphanumeric | Originating customer |
| 4 | R | 2 | Foreign exchange indicator | Alphanumeric | If 33B = USD then FF else VF |
| 5 | R | 1 | Foreign exchange ref. Indicator | Numeric | 1= F/X rate<br>2= F/X rate ref #<br>3= space filled |
| 6 | R | 15 | Foreign exchange ref | Alphanumeric | See field 5 |
| 7 | R | 2 | ISO dest. Country code | Alphanumeric | 'US' |
| 8 | M | 10 | Company ID | Alphanumeric User assigned number starting with '9' | Fixed value starting with '9' (user assigned) Fill with '9999999999' |
| 9 | M | 3 | Standard entry class code | Alphanumeric | 'CBR' |
| 10 | M | 10 | Company entry description | Alphanumeric | Payment details |
| 11 | R | 3 | ISO orig currency code | Alphanumeric | Local currency |
| 12 | R | 3 | ISO dest. currency code | Alphanumeric | 'USD'<br>Used for the settlement |
| 13 | R | 6 | Effective entry date | YYMMDD | Value Date. |
| 14 | M | 3 | Settlement date (Julian) | Numeric | Leave blank. FED will calculate Julian Date. |
| 15 | M | 1 | Originator status code | Alphanumeric | '1' |
| 16 | M | 8 | Originating DFI identification | TTTTAAAA | The pseudo ABA of EG member. |
| 17 | M | 7 | Batch number | Numeric | |

FIGURE 9H - CBR/PBR Detail Record – SWIFT to NACHA

| CBR/PBR DR Field No | Req | Length | Description | Contents | Values from Eurogiro |
|---|---|---|---|---|---|
| 1 | M | 1 | Record type code | '6' | '6' |
| 2 | M | 2 | Transaction code | Numeric | '22' Transaction may be returned if acct. is not truly 22 (checking) |
| 3 | M | 8 | Receiving DFI ID / OGO ID | ABA # | ABA # of receiving bank, supplied by sending customer. |
| 4 | M | 1 | Check digit | | ABA # of receiving bank, supplied by sending customer |
| 5 | R | 17 | DFI account number | Alphanumeric | Beneficiary account number |
| 6 | M | 10 | Amount | $$$$$$$$cc | Amount in USD |
| 7 | O | 15 | Identification number May be used by originator for tracing purposes | Alphanumeric | Blank |
| 8 | R | 22 | Receiving company name / Individual name | Alphanumeric | |
| 9 | O | 2 | Discretionary data | Alphanumeric | Blank |
| 10 | M | 1 | Addenda record indicator | Numeric | '1' |
| 11 | M | 15 | Trace number | Numeric | Must be generated: ABA+incr number |

FIGURE 9I - CBR/PBR Addenda Record – SWIFT to NACHA

| CBR/PBR AR Field No | Req | Length | Description | Contents | Values from Eurogiro |
|---|---|---|---|---|---|
| 1 | M | 1 | Record type code | '7' | '7' |
| 2 | M | 2 | Addenda type code | '01' | '01' |
| 3 | R | 3 | Transaction type code | Alphanumeric | Always 'MIS' |
| 4 | R | 11 | Foreign receiving DFI identification | Alphanumeric, leftjustified | ABA# of receiving bank including check digit = DR field 3 +4 |
| 5 | R | 15 | Foreign payment amount | $$$$$$$$$$$$$cc | DR f6 |
| 6 | O | 22 | Foreign trace number | alphanumeric | Transaction reference |
| 7 | R | 25 | Foreign receiver's account number | Alphanumeric | Beneficiary Account number = DRf5 |
| 8 | M | 15 | Trace number | Numeric | Same as in detail record |

FIGURE 9J - All Entries Batch Control Record – SWIFT to NACHA

| BCR Field No | Req | Length | Description | Contents | Values from Eurogiro |
|---|---|---|---|---|---|
| 1 | M | 1 | Record type code | '8' | '8' |
| 2 | M | 3 | Service class code | Numeric –must match batch header record | |
| 3 | M | 6 | Entry/Addenda count | Numeric | Always 2, |
| 4 | M | 10 | Entry Hash | Numeric | |
| 5 | M | 12 | Total Debit Entry dollar amount | $$$$$$$$$$cc | '000000000000' |
| 6 | M | 12 | Total Credit Entry dollar amount | $$$$$$$$$$cc | DR 6 |
| 7 | R | 10 | Company Identification | | Field 8 of BHR |
| 8 | O | 19 | Message Authentication code | Not used Space filled | |
| 9 | NA | 6 | Reserved | Space filled | |
| 10 | M | 8 | Originating DFI Identification | | BHR 16 |
| 11 | M | 7 | Batch number | Numeric | |

FIGURE 9K - All Entries File Control Record – SWIFT to NACHA

| FCR Field No Req. Length | | | Description | Contents | Values from Eurogiro |
|---|---|---|---|---|---|
| 1 | M | 1 | Record type code | '9' | '9' |
| 2 | M | 6 | Batch Count | Numeric | # Batches |
| 3 | M | 6 | Block Count | Numeric | # blocks |
| 4 | M | 8 | Entry / Addenda count | Numeric | # entries + # addenda |
| 5 | M | 10 | Entry Hash | Numeric | Hashed value |
| 6 | M | 12 | Total debit entry dollar amount | $$$$$$$$$$cc | '000000000000' |
| 7 | M | 12 | Total credit entry dollar amount | $$$$$$$$$$cc | Total amount |
| 8 | NA | 39 | Reserved | Blank | Blank |

Returns - File Format Description for NACHA to SWIFT Conversion

FIGURE 10A - File Header Record -- Returns from NACHA to SWIFT

| FHR Field No | Req | Length | Description | Contents | Values to Eurogiro |
|---|---|---|---|---|---|
| 1 | M | 1 | Record type code | '1' | '1' |
| 2 | R | 2 | Priority code | '01' | '01' |
| 3 | M | 10 | Immediate destination | bTTTTAAAAC | ABA # of EGO |
| 4 | M | 10 | Immediate origin | bTTTTAAAAC | FED ABA # |
| 5 | M | 6 | File creation date | YYMMDD | Input Date |
| 6 | O | 4 | File creation time | HHMM | Input Time |
| 7 | M | 1 | File ID modifier | A-Z, 0-9 | Per destination, starting each day with A |
| 8 | M | 3 | Record size | '094' | '094' |
| 9 | M | 2 | Blocking factor | '10' | '10' |
| 10 | M | 1 | Format code | '1' | '1' |
| 11 | O | 23 | Immediate destination name | Alphanumeric | |
| 12 | O | 23 | Immediate origin name | Alphanumeric | |
| 13 | O | 8 | Reference code | Alphanumeric | |

FIGURE 10B - CBR/PBR Batch Header Record — Returns from NACHA to SWIFT

| CBR/PBR BHR Field No Req Length | | | Description | Contents | Values to Eurogiro |
|---|---|---|---|---|---|
| 1 | M | 1 | Record type code | '5' | '5' |
| 2 | M | 3 | Service class code | Numeric | '220' (credit only transfer) or '200' (mixed credit and debits) |
| 3 | M | 16 | Company name | Alphanumeric | |
| 4 | R | 2 | Foreign exchange indicator | Alphanumeric | 'FV' (transfer in USD) |
| 5 | R | 1 | Foreign exchange ref. Indicator | Numeric | '3' |
| 6 | R | 15 | Foreign exchange ref | Alphanumeric | Space filled |
| 7 | R | 2 | ISO dest. Country code | Alphanumeric | ISO 2 code of country |
| 8 | M | 10 | Company ID (sending customer) | Alphanumeric | IRS "1" or User Assigned "9" Followed by a number |
| 9 | M | 3 | Standard entry class code | Alphanumeric | 'CBR' or 'PBR' |
| 10 | M | 10 | Company entry description | Alphanumeric | Payment details. ('REG.SALARY') |
| 11 | R | 3 | ISO orig currency . code | Alphanumeric | 'USD' |
| 12 | R | 3 | ISO dest. Currency code | Alphanumeric | (local currency or EUR) |
| 13 | R | 6 | Effective entry date | YYMMDD | Value Date from US Bank. May not always be a bank day → field 14 is the real Value Date |
| 14 | M | 3 | Settlement date (Julian) | Numeric | Value Date. |
| 15 | M | 1 | Originator status code | Alphanumeric | '1' or '2' |
| 16 | M | 8 | Originating DFI identification | TTTTAAAA | Ordering US Bank |
| 17 | M | 7 | Batch number | Numeric | |

FIGURE 10C – Return Entity Detail Record – Returns from NACHA to SWIFT

| Return DR Field | | | Description | Contents | Values to Eurogiro |
|---|---|---|---|---|---|
| No | Req | Length | | | |
| 1 | M | 1 | Record type code | '6' | '6' |
| 2 | M | | Transaction code | Numeric | '21' indicating the return |
| 3 | M | 8 | Receiving DFI ID / OGO ID | ABA # | Pseudo of EG Member Same as in FHR f3! |
| 4 | M | 1 | Check digit | | Same as last character in FHR f3 |
| 5 | R | 17 | DFI account number | Alphanumeric | Beneficiary account number. Truncated if IBAN is >17 characters. |
| 6 | M | 10 | Amount | $$$$$$$$cc | Returned amount in USD |
| 7 | O | 15 | Identification number | Alphanumeric | Possible use for additional info for beneficiary |
| 8 | R | 22 | Receiving company name | Alphanumeric | If 'CBR'=company name else 'PBR'=individual name |
| 9 | O | 2 | Discretionary data | Alphanumeric | blank |
| 10 | M | 1 | Addenda record indicator | Numeric | '1' |
| 11 | M | 15 | Trace number | Numeric | |

FIGURE 10D - CBR/PBR Return Addenda Record – Returns from NACHA to SWIFT

| CBR/PBR AR Field No | Req | Length | Description | Contents | Values to Eurogiro |
|---|---|---|---|---|---|
| 1 | M | 1 | Record type code | '7' | '7' |
| 2 | M | 2 | Addenda type code | '99' | '99' |
| 3 | M | 3 | Return reason code | Alphanumeric | Map values EGnn to Fed values |
| 4 | M | 15 | Original entry trace number | Numeric | From stored FedACH item DR field 11 |
| 5 | O | 6 | Date of death | YYMMDD | |
| 6 | R | 8 | Original Receiving DFI | TTTTAAAA | From stored FedACH item DR field 3 |
| 7 | R | 11 | Foreign receiving DFI | Alphanumeric | From stored FedACH item AD field 4 |
| 8 | R | 10 | Original forward entry payment amount | $$$$$$$$cc | From stored FedACH item DR field 6 |
| 9 | R | 15 | Foreign payment amount | $$$$$$$$$$$$$cc | From stored FedACH item AD 5 |
| 10 | O | 8 | Addenda Information | Alphanumeric | Space fill |
| 11 | M | 15 | Trace Number | Numeric | Same as in DR field 11 |

FIGURE 10E - Batch Control Record – Returns from NACHA to SWIFT

| BCR Field No | Req | Length | Description | Contents | Values to Eurogiro |
|---|---|---|---|---|---|
| 1 | M | 1 | Record type code | '8' | '8' |
| 2 | M | 3 | Service class code | Numeric | must match batch header record |
| 3 | M | 6 | Entry/Addenda count | Numeric | |
| 4 | M | 10 | Entry Hash | Numeric | |
| 5 | M | 12 | Total Debit Entry dollar amount | $$$$$$$$$$cc | '000000000000' |
| 6 | M | 12 | Total Credit Entry dollar amount | $$$$$$$$$$cc | |
| 7 | R | 10 | Company Identification | | Field 8 of BHR |
| 8 | O | 19 | Message Authentication code | Not used Space filled | |
| 9 | NA | 6 | Reserved | Space filled | |
| 10 | M | 8 | Originating OFI Identification | | |
| 11 | M | 7 | Batch number | Numeric | |

FIGURE 10F - Return Reason Codes – Returns from NACHA to SWIFT

| USGO reason code | FED Return reason | Eurogiro reason code | Eurogiro Return reason |
|---|---|---|---|
| R02 | Account closed | EG01 | Account closed, no forwarding possible |
| R03 | No account / Unable to locate Account | EG02 | No match account number – name |
| R04 | Invalid account number | EG07 | Account number wrong |
| R06 | Returned by ODFI's request | EG15 | At request of sender |
| R07 | Receiver Dispute, Authorization revoked by the receiver | EG06 | Returned by beneficiary |
| R09 | Uncollected funds | EG14 | Validity period exceeded / Payment not collected |
| R12 | Branch sold to another DFI | EG08 | Beneficiary bank-identifier wrong |
| R13 | RDFI not Qualified to participate | EG09 | Other reasons |
| R14 | Representative deceased | EG09 | Other reasons |
| R15 | Beneficiary or account holder deceased | EG04 | Beneficiary deceased |
| R16 | Account frozen | EG10 | handling prohibited for legal reasons |
| R17 | File record criteria | EG03 | insufficient information to complete the transaction |
| R18 | Improper effective entry date | EG03 | insufficient information to complete the transaction |
| R19 | Amount field error | EG03 | insufficient information to complete the transaction |
| R21 | Invalid company identification | EG03 | insufficient information to complete the transaction |
| R22 | Invalid individual ID number | EG09 | Other reasons |
| R23 | Credit refused by receiver | EG06 | Returned by beneficiary |
| R24 | Duplicate entry | EG09 | Other reason. To be followed up by an alarm! |
| R25 | Addenda error | EG03 | insufficient information to complete the transaction. To be followed up by an alarm! |
| R26 | Mandatory field error | EG03 | insufficient information to complete the transaction. |
| R27 | Trace number error | EG03 | insufficient information to complete the transaction. To be followed up by an alarm! |
| R28 | Routing Number Check Digit error | EG08 | Beneficiary bank-identifier wrong |
| R80 | Cross-border payment coding error | EG03 | insufficient information to complete the transaction |
| R81 | Non-participation in cross-border program | EG08 | Beneficiary bank-identifier wrong |
| R83 | Foreign receiving DFI unable to settle | EG09 | Other reasons |

FIGURE 10G - All Entries File Control Record -- Returns from NACHA to SWIFT

| FCR Field No | Req | Length | Description | Contents | Values to Eurogiro |
|---|---|---|---|---|---|
| 1 | M | 1 | Record type code | '9' | '9' |
| 2 | M | 6 | Batch Count | Numeric | # Batches |
| 3 | M | 6 | Block Count | Numeric | # blocks |
| 4 | M | 8 | Entry / Addenda count | Numeric | # entries + # addenda |
| 5 | M | 10 | Entry Hash | Numeric | Hashed value |
| 6 | M | 12 | Total debit entry dollar amount | $$$$$$$$$$cc | '000000000000' |
| 7 | M | 12 | Total credit entry dollar amount | $$$$$$$$$$cc | Total amount |
| 8 | NA | 39 | Reserved | Blank | Blank |

FIGURE 10H - SWIFT Basic Header -- Returns from NACHA to SWIFT

|  | BH Tag | Field Name | Content / Options |
|---|---|---|---|
| M |  | Application Identifier | F |
| M |  | Data Unit | 01 |
| M |  | Receiver address (BIC) | 12a |
| M |  | Dummy | 0000 |
| M |  | Output Sequence Number | 6!n |

FIGURE 10I - SWIFT Application Header -- Returns from NACHA to SWIFT

|  | AH Tag | Field Name | Content / Options |
|---|---|---|---|
| M |  | Output Identifier | O |
| M |  | Message Type | 198 |
| M |  | Input time (from sender) | 4n |
| M |  | MIR<br>Input date<br>Senders address (BIC)<br>Dummy<br>Input sequence number | <br>6n<br>12a<br>0000<br>6n |
| M |  | Output date | 6n |
| M |  | Output time (receiver's local) | 4n |
| M |  | Message priority | ('N'|'U') |

FIGURE 10J – SWIFT User Header – Returns from NACHA to SWIFT

|   | UH Tag | Field Name | Content / Options |
|---|---|---|---|
| M | 108 | Reference Number | 16x |
| M | 901 | Currency Code | 'USD' |
| M | 902 | Value Date | 6n |
| M | 903 | Product Code | '93' |

FIGURE 10K – SWIFT Text block – Returns from NACHA to SWIFT

|   | TB Tag | Field Name | Content / Options |
|---|---|---|---|
| M | 20 | Senders reference number | 16x |
| M | 12 | Sub-message type | '093' |
| M | 21 | Related reference (field 20 of original message) | 16x |
| O | 53A | Sender's correspondent | 6!a2!c |
| O | 11R | Message type<br>and date of original message sent<br>and – if available - the original ISN no. | 3n<br>6n<br>'0000'6n |
| M | 79 | Reason for return<br>and returned currency and amount<br><br>and optional copy of original message | Reason code |

FIGURE 10L – SWIFT Trailer – Returns from NACHA to SWIFT

|   | TR Tag | Field Name | Content / Options |
|---|---|---|---|
| M | NOM | Number of Messages | 5n |
| M | TOT | Total of Amounts | 18no |
| M | PDF | Possible Duplicate File | ('0'|'1') |
| O | PDE | Possible Duplicate Emission | 6n |
| M | MAC | Message Authentication Code | 8h |

Rejections - File Format Description for NACHA to SWIFT Conversion

FIGURE 11A - File Header Record — Rejects from NACHA to SWIFT

| FHR Field No | Req | Length | Description | Contents | Values to Eurogiro |
|---|---|---|---|---|---|
| 1 | M | 1 | Record type code | '1' | '1' |
| 2 | R | 2 | Priority code | '01' | '01' |
| 3 | M | 10 | Immediate destination | BTTTTAAAAC | ABA # of EGO |
| 4 | M | 10 | Immediate origin | BTTTTAAAAC | FED ABA # |
| 5 | M | 6 | File creation date | YYMMDD | Input Date |
| 6 | O | 4 | File creation time | HHMM | Input Time |
| 7 | M | 1 | File ID modifier | A-Z, 0-9 | Per destination, starting each day with A |
| 8 | M | 3 | Record size | '094' | '094' |
| 9 | M | 2 | Blocking factor | '10' | '10' |
| 10 | M | 1 | Format code | '1' | '1' |
| 11 | O | 23 | Immediate destination name | Alphanumeric | |
| 12 | O | 23 | Immediate origin name | Alphanumeric | |
| 13 | O | 8 | Reference code | Alphanumeric | |

FIGURE 11B - CBR/PBR Batch Header Record – Rejects from NACHA to SWIFT

| CBR/PBR BHR Field No | Req | Length | Description | Contents | Values to Eurogiro |
|---|---|---|---|---|---|
| 1 | M | 1 | Record type code | '5' | '5' |
| 2 | M | 3 | Service class code | Numeric | '220' (credit only transfer) or '200' (mixed credit and debits) |
| 3 | M | 16 | Company name | Alphanumeric | |
| 4 | R | 2 | Foreign exchange indicator | Alphanumeric | 'FV' (transfer in USD) |
| 5 | R | 1 | Foreign exchange ref. Indicator | Numeric | '3' |
| 6 | R | 15 | Foreign exchange ref | Alphanumeric | Space filled |
| 7 | R | 2 | ISO dest. Country code | Alphanumeric | 'US' |
| 8 | M | 10 | Company ID (sending customer) | Alphanumeric | IRS "1" or User Assigned "9" Followed by a number |
| 9 | M | 3 | Standard entry class code | Alphanumeric | 'CBR' or 'PBR' |
| 10 | M | 10 | Company entry description | Alphanumeric | Payment details. ('REG.SALARY') |
| 11 | R | 3 | ISO orig currency . code | Alphanumeric | 'USD' |
| 12 | R | 3 | ISO dest. Currency code | Alphanumeric | (local currency or EUR) |
| 13 | R | 6 | Effective entry date | YYMMDD | Value Date from US Bank. May not always be a bank day → field 14 is the real Value Date |
| 14 | M | 3 | Settlement date (Julian) | Numeric | Value Date. |
| 15 | M | 1 | Originator status code | Alphanumeric | '1' or '2' – no change from the original |
| 16 | M | 8 | Originating DFI identification | TTTTAAAA | |
| 17 | M | 7 | Batch number | Numeric | No change from the original |

FIGURE 11C - Return Entity Detail Record – Rejects from NACHA to SWIFT

| Return DR Field No | Req | Length | Description | Contents | Values to Eurogiro |
|---|---|---|---|---|---|
| 1 | M | 1 | Record type code | '6' | '6' |
| 2 | M |  | Transaction code | Numeric | '22' Transaction may be returned if acct. is not truly 22 (checking) |
| 3 | M | 8 | Receiving DFI ID / OGO ID | ABA # | Pseudo of EG Member Same as in FHR f3! |
| 4 | M | 1 | Check digit |  | Same as last character in FHR f3 |
| 5 | R | 17 | DFI account number | Alphanumeric | Beneficiary account number. Truncated if IBAN is >17 characters. |
| 6 | M | 10 | Amount | $$$$$$$$cc | Returned amount in USD |
| 7 | O | 15 | Identification number | Alphanumeric | Possible use for additional info for beneficiary |
| 8 | R | 22 | Receiving company name | Alphanumeric | If 'CBR'=company name else 'PBR'=individual name |
| 9 | O | 2 | Discretionary data | Alphanumeric | Blank |
| 10 | M | 1 | Addenda record indicator | Numeric | '1' |
| 11 | M | 15 | Trace number | Numeric |  |

FIGURE 11D - CBR/PBR Return Addenda Record – Rejects from NACHA to SWIFT

| CBR/PBR AR Field No | Req | Length | Description | Contents | Values to Eurogiro |
|---|---|---|---|---|---|
| 1 | M | 1 | Record type code | '7' | '7' |
| 2 | M | 2 | Addenda type code | '99' | '99' |
| 3 | M | 3 | Return reason code | Alphanumeric | |
| 4 | M | 15 | Original entry trace number | Numeric | From stored FedACH item DR field 11 |
| 5 | O | 6 | Date of death | YYMMDD | |
| 6 | R | 8 | Original Receiving DFI | TTTTAAAA | From stored FedACH item DR field 3 |
| 7 | R | 11 | Foreign receiving DFI | Alphanumeric | From stored FedACH item AD field 4 |
| 8 | R | 10 | Original forward entry payment amount | $$$$$$$$cc | From stored FedACH item DR field 6 |
| 9 | R | 15 | Foreign payment amount | $$$$$$$$$$$$$cc | From stored FedACH item AD 5 |
| 10 | O | 8 | Addenda Information | Alphanumeric | Space fill |
| 11 | M | 15 | Trace Number | Numeric | Same as in DR field 11 |

FIGURE 11E - Batch Control Record – Rejects from NACHA to SWIFT

| BCR Field No | Req | Length | Description | Contents | Values to Eurogiro |
|---|---|---|---|---|---|
| 1 | M | 1 | Record type code | '8' | '8' |
| 2 | M | 3 | Service class code | Numeric – must match batch header record | |
| 3 | M | 6 | Entry/Addenda count | Numeric | |
| 4 | M | 10 | Entry Hash | Numeric | |
| 5 | M | 12 | Total Debit Entry dollar amount | $$$$$$$$$$cc | '000000000000' |
| 6 | M | 12 | Total Credit Entry dollar amount | $$$$$$$$$$cc | |
| 7 | R | 10 | Company Identification | | Field 8 of BHR |
| 8 | O | 19 | Message Authentication code | Not used | |
| 9 | NA | 6 | Reserved | | |
| 10 | M | 8 | Originating OFI Identification | | |
| 11 | M | 7 | Batch number | Numeric | |

FIGURE 11F - All Entries File Control Record -- Rejects from NACHA to SWIFT

| FCR Field | | | Description | Contents | Values to Eurogiro |
|---|---|---|---|---|---|
| No | Req | Length | | | |
| 1 | M | 1 | Record type code | '9' | '9' |
| 2 | M | 6 | Batch Count | Numeric | # Batches |
| 3 | M | 6 | Block Count | Numeric | # blocks |
| 4 | M | 8 | Entry / Addenda count | Numeric | # entries + # addenda |
| 5 | M | 10 | Entry Hash | Numeric | Hashed value |
| 6 | M | 12 | Total debit entry dollar amount | $$$$$$$$$$cc | '000000000000' |
| 7 | M | 12 | Total credit entry dollar amount | $$$$$$$$$$cc | Total amount |
| 8 | NA | 39 | Reserved | Blank | Blank |

Forward Payment - File Format Description for NACHA to SWIFT Conversion

FIGURE 12A - File Header Record – NACHA to SWIFT

| FHR Field | | | Description | Contents | Values to Eurogiro |
|---|---|---|---|---|---|
| No | Req | Length | | | |
| 1 | M | 1 | Record type code | '1' | '1' |
| 2 | R | 2 | Priority code | '01' | '01' |
| 3 | M | 10 | Immediate destination | bTTTTAAAAC | ABA # of EGO |
| 4 | M | 10 | Immediate origin | bTTTTAAAAC | FED ABA # |
| 5 | M | 6 | File creation date | YYMMDD | Input Date |
| 6 | O | 4 | File creation time | HHMM | Input Time |
| 7 | M | 1 | File ID modifier | A-Z, 0-9 | Per destination, starting each day with A |
| 8 | M | 3 | Record size | '094' | '094' |
| 9 | M | 2 | Blocking factor | '10' | '10' |
| 10 | M | 1 | Format code | '1' | '1' |
| 11 | O | 23 | Immediate destination name | Alphanumeric | |
| 12 | O | 23 | Immediate origin name | Alphanumeric | |
| 13 | O | 8 | Reference code | Alphanumeric | |

FIGURE 12B - CBR/PBR Batch Header Record – NACHA to SWIFT

| BHR Field No | Req | Length | Description | Contents | Values to Eurogiro |
|---|---|---|---|---|---|
| 1 | M | 1 | Record type code | '5' | '5' |
| 2 | M | 3 | Service class code | Numeric | '220' (credit only transfer) or '200' (mixed credit and debits) |
| 3 | M | 16 | Company name | Alphanumeric | |
| 4 | R | 2 | Foreign exchange indicator | Alphanumeric | 'FV' (transfer in USD) |
| 5 | R | 1 | Foreign exchange ref. Indicator | Numeric | '3' |
| 6 | R | 15 | Foreign exchange ref | Alphanumeric | Space filled |
| 7 | R | 2 | ISO dest. Country code | Alphanumeric | ISO 2 code of destination country |
| 8 | M | 10 | Company ID (sending customer) | Alphanumeric | IRS "1" or DUNS "3" or User Assigned "9" Followed by a number |
| 9 | M | 3 | Standard entry class code | Alphanumeric | 'CBR' or 'PBR' |
| 10 | M | 10 | Company entry description | Alphanumeric | Payment details. ('REG.SALARY') |
| 11 | R | 3 | ISO orig currency. code | Alphanumeric | 'USD' |
| 12 | R | 3 | ISO dest. Currency code | Alphanumeric | local currency |
| 13 | R | 6 | Effective entry date | YYMMDD | Value Date from US Bank. May not always be a bank day → field 14 is the real Value Date |
| 14 | M | 3 | Settlement date (Julian) | Numeric | Value Date. |
| 15 | M | 1 | Originator status code | Alphanumeric | '1' or '2' |
| 16 | M | 8 | Originating DFI identification | TTTTAAAA | Ordering US Bank |
| 17 | M | 7 | Batch number | Numeric | |

FIGURE 12C - Detail Record – NACHA to SWIFT

| DR Field No | Req | Length | Description | Contents | Values to Eurogiro |
|---|---|---|---|---|---|
| 1 | M | 1 | Record type code | '6' | '6' |
| 2 | M |  | Transaction code | Numeric | '22' = checking account '32' = Savings account (probably only '22')! |
| 3 | M | 8 | Receiving DFI ID / OGO ID | ABA # | Pseudo of EG Member Same as in FHR f3! |
| 4 | M | 1 | Check digit |  | Same as last character in FHR f3 |
| 5 | R | 17 | DFI account number | Alphanumeric | Beneficiary account number. Truncated if IBAN is >17 characters. |
| 6 | M | 10 | Amount | $$$$$$$$cc | Amount in USD |
| 7 | O | 15 | Identification number | Alphanumeric | Possible use for additional info for beneficiary |
| 8 | R | 22 | Receiving company name | Alphanumeric | If 'CBR'=company name else 'PBR'=individual name |
| 9 | O | 2 | Discretionary data | Alphanumeric | blank |
| 10 | M | 1 | Addenda record indicator | Numeric | '1' |
| 11 | M | 15 | Trace number | Numeric |  |

FIGURE 12D - Addenda Record– NACHA to SWIFT

| AR Field No | Req | Length | Description | Contents | Values to Eurogiro |
|---|---|---|---|---|---|
| 1 | M | 1 | Record type code | '7' | '7' |
| 2 | M | 2 | Addenda type code | '01' | '01' |
| 3 | R | 3 | Transaction type code | Alphanumeric | Purpose of payment: ANNuity BUSiness DEPosits LOAn MIScellaneous mortgage PENsion RLS rent or lease SALary TAX |
| 4 | R | 11 | Foreign receiving DFI identification | Alphanumeric | BIC address of another bank, 8 or 11 characters left justified |
| 5 | R | 15 | Foreign payment amount | $$$$$$$$$$$$$cc | USD amount |
| 6 | O | 22 | Foreign trace number | Numeric | |
| 7 | R | 25 | Foreign receiver's account number | Alphanumeric | IBAN (pilots have IBAN < 25) IBAN is recognized by 'AANN' |
| 8 | M | 15 | Trace number | Numeric | Same as in detail record |

FIGURE 12E - Batch Control Record – NACHA to SWIFT

| BCR Field No | Req | Length | Description | Contents | Values to Eurogiro |
|---|---|---|---|---|---|
| 1 | M | 1 | Record type code | '8' | '8' |
| 2 | M | 3 | Service class code | Numeric –must match batch header record | |
| 3 | M | 6 | Entry/Addenda count | Numeric | |
| 4 | M | 10 | Entry Hash | Numeric | |
| 5 | M | 12 | Total Debit Entry dollar amount | $$$$$$$$$$cc | '000000000000' |
| 6 | M | 12 | Total Credit Entry dollar amount | $$$$$$$$$$cc | |
| 7 | R | 10 | Company Identification | | Field 8 of BHR |
| 8 | O | 19 | Message Authentication code | Not used | |
| 9 | NA | 6 | Reserved | | |
| 10 | M | 8 | Originating OFI Identification | | |
| 11 | M | 7 | Batch number | Numeric | |

FIGURE 12F - File Control Record – NACHA to SWIFT

| FCR Field No | Req | Length | Description | Contents | Values to Eurogiro |
|---|---|---|---|---|---|
| 1 | M | 1 | Record type code | '9' | '9' |
| 2 | M | 6 | Batch Count | Numeric | # Batches |
| 3 | M | 6 | Block Count | Numeric | # blocks |
| 4 | M | 8 | Entry / Addenda count | Numeric | # entries + # addenda |
| 5 | M | 10 | Entry Hash | Numeric | Hashed value |
| 6 | M | 12 | Total debit entry dollar amount | $$$$$$$$$$cc | '000000000000' |
| 7 | M | 12 | Total credit entry dollar amount | $$$$$$$$$$cc | Total amount |
| 8 | NA | 39 | Reserved | Blank | Blank |

FIGURE 12G - SWIFT Basic Header – NACHA to SWIFT

|  | BH Tag | Field Name | Content / Options |
|---|---|---|---|
| M |  | Application Identifier | F |
| M |  | Data Unit | 01 |
| M |  | Receiver address (BIC) | 12a |
| M |  | Dummy | 0000 |
| M |  | Output Sequence Number | 6!n |

FIGURE 12H - SWIFT Application Header – NACHA to SWIFT

|  | AH Tag | Field Name | Content / Options |
|---|---|---|---|
| M |  | Output Identifier | O |
| M |  | Message Type | 103 |
| M |  | Input time (from sender) | 4n |
| M |  | MIR<br>Input date<br>Senders address (BIC)<br>Dummy<br>Input sequence number | <br>6n<br>12a<br>0000<br>6n |
| M |  | Output date | 6n |
| M |  | Output time (receiver's local) | 4n |
| M |  | Message priority | ('N'\|'U') |

FIGURE 12I - SWIFT User Header – NACHA to SWIFT

|   | Tag | Field Name | Content / Options |
|---|---|---|---|
| M | 108 | Reference Number | 16x |
| M | 901 | Currency Code | 'USD' |
| M | 902 | Value Date | 6n |
| M | 903 | Product Code | '10' |
| M | 904 | BEN / SHA/ OUR Specification | 'OUR' |

FIGURE 12J - SWIFT Text Block/ Transaction Data – NACHA to SWIFT

|   | TB Tag | Field Name | Content / Options |
|---|---|---|---|
| M | 20 | Senders reference number | 16x |
| M | 23B | Bank Operation Code |   |
| O | 23E | Instruction code |   |
| O | 26T | Transaction Type Code | 3!a |
| M | 32A | Value Date/Currency Code/Interbank Settled Amount | 6!n'USD'15d |
| O | 33B | Currency and Original ordered amount | 3!a15d |
| O | 36 | Exchange rate | 12n |
| M | 50K | Ordering Customer | 4*35x |
| O | 52D | Ordering institution |   |
| O | 53A | Sender's correspondent | 6!a2!c |
| O | 57A | Account With Institution | /34x |
| M | 59 | Beneficiary Customer | [/34x] 4*35x |
| O | 70 | Remittance Information, Details of payment | 4*35x |
| O | 71F | Sender's Charges | 3!a15d |
| O | 71G | Receiver's Charges | 3!a15d |
| O | 72 | Sender to receiver information | 6*35x |

FIGURE 12K - SWIFT Trailer – NACHA to SWIFT

|   | TR Tag | Field Name | Content / Options |
|---|---|---|---|
| M | NOM | Number of Messages | 5n |
| M | TOT | Total of Amounts | 18no |
| M | PDF | Possible Duplicate File | ('0'|'1') |
| O | PDE | Possible Duplicate Emission | 6n |
| M | MAC | Message Authentication Code | 8h |

Returns - File Format Description for SWIFT to NACHA Conversion

FIGURE 13A -Return Reason Codes – Returns from SWIFT to NACHA

| Eurogiro reason code | Eurogiro Return reason | FED reason code | FED Return reason |
|---|---|---|---|
| /EG01/ | Account closed, no forwarding possible | R02 | Account closed |
| /EG02/ | No match account number – name | R03 | No account / unable to locate Account |
| /EG03/ | Insufficient information to complete transaction | R17 | File record criteria |
| /EG04/ | Beneficiary deceased | R15 | Beneficiary or Account holder deceased |
| /EG05/ | Beneficiary not known on the stated address | R17 | File record criteria |
| /EG06/ | Returned by beneficiary | R23 | Credit Entry Refused by Receiver |
| /EG07/ | Account number wrong | R04 | Invalid account number |
| /EG08/ | Beneficiary bank-identifier wrong | R82 | Invalid Foreign receiving DFI ID |
| /EG09/ Not to be used | Other reasons | R17 | File record criteria |
| /EG10/ | Handling prohibited for legal reasons | R16 | Account frozen |
| /EG15/ | At request of sender | R06 | Returned by ODFI's request |

FIGURE 13B - SWIFT Basic Header – Returns SWIFT to NACHA

|   | BH Tag | Field Name | Content / Options |
|---|---|---|---|
| M |   | Application Identifier | F |
| M |   | Data Unit | 01 |
| M |   | Receiver address (BIC) | 12a |
| M |   | Dummy | 0000 |
| M |   | Output Sequence Number | 6!n |

FIGURE 13C - SWIFT Application Header – Returns SWIFT to NACHA

|   | AH Tag | Field Name | Content / Options |
|---|---|---|---|
| M |   | Output Identifier | O |
| M |   | Message Type | 198 |
| M |   | Input time (from sender) | 4n |
| M |   | MIR<br>Input date<br>Senders address (BIC)<br>Dummy<br>Input sequence number | <br>6n<br>12a<br>0000<br>6n |
| M |   | Output date | 6n |
| M |   | Output time (receiver's local) | 4n |
| M |   | Message priority | ('N'|'U') |

FIGURE 13D - SWIFT User Header – Returns from SWIFT to NACHA

|   | UH Tag | Field Name | Content / Options |
|---|---|---|---|
| M | 108 | Reference Number | 16x |
| M | 901 | Currency Code | 'USD' |
| M | 902 | Value Date | 6n |
| M | 903 | Product Code | '93' |

FIGURE 13E - SWIFT Text Block – Returns from SWIFT to NACHA

|   | TB Tag | Field Name | Content / Options |
|---|---|---|---|
| M | 20 | Senders reference number | 16x |
| M | 12 | Sub-message type | '093' |
| M | 21 | Related reference (field 20 of original message) | 16x |
| O | 53A | Sender's correspondent | 6!a2!c |
| O | 11R | Message type and date of original message sent and - if available - the original ISN no. | 3n<br>6n<br>'0000'6n |
| M | 79 | Reason for return and returned currency and amount<br><br>and optional copy of original message | Reason code |

FIGURE 13F - SWIFT Trailer – Returns from SWIFT to NACHA

|   | Tag | Field Name | Content / Options |
|---|---|---|---|
| M | NOM | Number of Messages | 5n |
| M | TOT | Total of Amounts | 18no |
| M | PDF | Possible Duplicate File | ('0'|'1') |
| O | PDE | Possible Duplicate Emission | 6n |
| M | MAC | Message Authentication Code | 8h |

FIGURE 13G - File Header Record – Returns from SWIFT to NACHA

| FHR Field No Req Length | | | Description | Contents | Values from Eurogiro |
|---|---|---|---|---|---|
| 1 | M | 1 | Record type code | '1' | '1' |
| 2 | R | 2 | Priority code | '01' | '01' |
| 3 | M | 10 | Immediate destination | bTTTTAAAAC | |
| 4 | M | 10 | Immediate origin | bTTTTAAAAC | ABA # of EGO |
| 5 | M | 6 | File creation date | YYMMDD | Input Date |
| 6 | O | 4 | File creation time | HHMM | Input Time |
| 7 | M | 1 | File ID modifier | A-Z, 0-9 | Per destination, starting each day with A |
| 8 | M | 3 | Record size | '094' | '094' |
| 9 | M | 2 | Blocking factor | '10' | '10' |
| 10 | M | 1 | Format code | '1' | '1' |
| 11 | O | 23 | Immediate dest. name | Alphanumeric | Blank |
| 12 | O | 23 | Immediate origin name | Alphanumeric | Blank |
| 13 | O | 8 | Reference code | Alphanumeric | Country code + ISN number |

FIGURE 13H - CBR/PRB Returns Batch Header Record  – Returns from SWIFT to NACHA

| CBR/PBR BHR Field | | | Description | Contents | Values from Eurogiro |
|---|---|---|---|---|---|
| No | Req | Length | | | |
| 1 | M | 1 | Record type code | '5' | '5' |
| 2 | M | 3 | Service class code | Numeric | From stored FedACH |
| 3 | M | 16 | Company name | Alphanumeric | From stored FedACH |
| 4 | R | 2 | Foreign exchange indicator | Alphanumeric | From stored FedACH |
| 5 | R | 1 | Foreign exchange ref. indicator | Numeric | From stored FedACH |
| 6 | R | 15 | Foreign exchange ref | Alphanumeric | Blank |
| 7 | R | 2 | ISO dest. country code | Alphanumeric | 'US' |
| 8 | M | 10 | Company ID | Alphanumeric | From stored FedACH |
| 9 | M | 3 | Standard entry class code | Alphanumeric | 'CBR' or 'PBR' from stored FedACH |
| 10 | M | 10 | Company entry description | Alphanumeric | From stored FedACH |
| 11 | R | 3 | ISO orig currency . code | Alphanumeric | From stored FedACH BHR field 12 in original item |
| 12 | R | 3 | ISO dest. currency code | Alphanumeric | 'USD' Used for the settlement |
| 13 | R | 6 | Effective entry date | YYMMDD | From stored FedACH |
| 14 | M | 3 | Settlement date (Julian) | Numeric | Blank |
| 15 | M | 1 | Originator status code | Alphanumeric | '1' |
| 16 | M | 8 | Originating DFI identification | TTTTAAAA | From stored DR field 3 |
| 17 | M | 7 | Batch number | Numeric | |

FIGURE 13I - Return Entity Detail Record – Returns from SWIFT to NACHA

| DR Field No | Req | Length | Description | Contents | Values from Eurogiro |
|---|---|---|---|---|---|
| 1 | M | 1 | Record type code | '6' | '6' |
| 2 | M | 2 | Transaction code | Numeric | Taken from DR field 2: if = '22' then '21' if = '32' then '31' |
| 3 | M | 8 | Receiving DFI ID | ABA # | From stored BHR f 16 |
| 4 | M | 1 | Check digit | | Calculate using mod10 |
| 5 | R | 17 | DFI account number | Alphanumeric | From stored FedACH item DR field 5 |
| 6 | M | 10 | Total amount | $$$$$$$$cc | Amount in USD |
| 7 | O | 15 | Identification number May be used by originator for tracing purposes | Alphanumeric | From stored FedACH |
| 8 | R | 22 | Receiving company name / Individual name | Alphanumeric | From stored FedACH |
| 9 | R | 2 | Discretionary data | Alphanumeric | From stored FedACH |
| 10 | M | 1 | Addenda Record indicator | '1' | |
| 11 | M | 15 | Trace number | Numeric | ABA of EGO + incr number |

FIGURE 13J - CBR/PRB Return Addenda Record – Returns from SWIFT to NACHA

| CBR/PBR AR Field No | Req | Length | Description | Contents | Values from Eurogiro |
|---|---|---|---|---|---|
| 1 | M | 1 | Record type code | '7' | '7' |
| 2 | M | 2 | Addenda type code | '99' | '99' |
| 3 | M | 3 | Return reason code | Alphanumeric | Map values EGnn to Fed values |
| 4 | M | 15 | Original entry trace number | Numeric | From stored FedACH item DR field 11 |
| 5 | O | 6 | Date of death | YYMMDD | |
| 6 | R | 8 | Original Receiving DFI | TTTTAAAA | From stored FedACH item DR field 3 |
| 7 | R | 11 | Foreign receiving DFI | Alphanumeric | From stored FedACH item AD field 4 |
| 8 | R | 10 | Original forward entry payment amount | $$$$$$$$cc | From stored FedACH item DR field 6 |
| 9 | R | 15 | Foreign payment amount | $$$$$$$$$$$$$cc | Same as previous field (AR 8) |
| 10 | O | 8 | Addenda Information | Alphanumeric | Space fill |
| 11 | M | 15 | Trace Number | Numeric | Same as in DR field 11 |

FIGURE 13K - Batch Control Record – Returns from SWIFT to NACHA

| BCR Field No | Req | Length | Description | Contents | Values from Eurogiro |
|---|---|---|---|---|---|
| 1 | M | 1 | Record type code | '8' | '8' |
| 2 | M | 3 | Service class code | Numeric –must match batch header record | |
| 3 | M | 6 | Entry/Addenda count | Numeric | |
| 4 | M | 10 | Entry Hash | Numeric | |
| 5 | M | 12 | Total Debit Entry dollar amount | $$$$$$$$$$cc | '000000000000' |
| 6 | M | 12 | Total Credit Entry dollar amount | $$$$$$$$$$cc | |
| 7 | R | 10 | Company Identification | | Field 8 of BHR |
| 8 | O | 19 | Message Authentication code | Not used | |
| 9 | NA | 6 | Reserved | | |
| 10 | M | 8 | Originating OFI Identification | | |
| 11 | M | 7 | Batch number | Numeric | |

FIGURE 13L - All Entries File Control Record – Returns from SWIFT to NACHA

| FCR Field No | Req. | Length | Description | Contents | Values from Eurogiro |
|---|---|---|---|---|---|
| 1 | M | 1 | Record type code | '9' | '9' |
| 2 | M | 6 | Batch Count | Numeric | # Batches |
| 3 | M | 6 | Block Count | Numeric | # blocks |
| 4 | M | 8 | Entry / Addenda count | Numeric | # entries + # addenda |
| 5 | M | 10 | Entry Hash | Numeric | Hashed value |
| 6 | M | 12 | Total debit entry dollar amount | $$$$$$$$$$cc | '000000000000' |
| 7 | M | 12 | Total credit entry dollar amount | $$$$$$$$$$cc | Total amount |
| 8 | NA | 39 | reserved | Blank | Blank |

Advice File - File Format Description for NACHA to SWIFT Conversion

FIGURE 14A - Advice File Header Record – NACHA to SWIFT

| ADV FHR Field No | Req | Length | Description | Contents | Values to Eurogiro |
|---|---|---|---|---|---|
| 1 | M | 1 | Record type code | '1' | 1 |
| 2 | R | 2 | Priority code | Numeric | Always '01' |
| 3 | M | 10 | Immediate destination | BTTTTAAAAC | |
| 4 | M | 10 | Immediate origin | BTTTTAAAAC | |
| 5 | M | 6 | File creation date | YYMMDD | FedACH process date |
| 6 | O | 4 | File creation time | HHMM | System time when file created |
| 7 | M | 1 | File ID modifier | Upper case A-Z, 0-9 | First advice of day will be '1', second advice will be '2' |
| 8 | M | 3 | Record size | '094' | Always 094 |
| 9 | M | 2 | Blocking factor | '10' | Always 10 |
| 10 | M | 1 | Format code | '1' | Always 1 |
| 11 | M | 23 | Immediate destination name | Alphanumeric | Name of EUROGIRO NETWORK A/S as it appears on FedACH Customer directory |
| 12 | M | 23 | Immediate origin name | Alphanumeric | |
| 13 | O | 8 | Reference code | Alphanumeric | Always 'ADV FILE' |

FIGURE 14B - All Entries Company/Batch Header Record – NACHA to SWIFT

| ADV BHR Field No | Req | Length | Description | Contents | Values to Eurogiro |
|---|---|---|---|---|---|
| 1 | M | 1 | Record type code | '5' | 5 |
| 2 | M | 3 | Service class code | Numeric | 280 |
| 3 | M | 16 | Company Name | Alphanumeric | FRB ACH |
| 4 | O/R | 20 | Company Discretionary Data | Alphanumeric | Blank |
| 5 | M | 10 | Company Identification | Alphanumeric | 00000 |
| 6 | M | 3 | Standard Entry Class Code | Alphanumeric | ADV |
| 7 | M | 10 | Company Entry Description | Alphanumeric | ACH ADVICE |
| 8 | O | 6 | Company Descriptive Date | Alphanumeric | Blank |
| 9 | R | 6 | Effective Entry Date | YYMMDD | Calendar date of when funds are to be available |
| 10 |  | 3 | Settlement Date (Julian) Inserted by ACH Operator | Numeric | Julian date of when Fed will settle funds at US Correspondent account |
| 11 | M | 1 | Originator Status Code | Alphanumeric | 0 |
| 12 | M | 8 | Originating DFI Identification | TTTTAAAA |  |
| 13 | M | 7 | Batch Number | Numeric | Sequential number within file; always starting with 0000001 |

FIGURE 14C - Advice Entry Detail Record – NACHA to SWIFT

| ADV DR Field No | Req | Length | Description | Contents | Values to Eurogiro |
|---|---|---|---|---|---|
| 1 | M | 1 | Record type code | '6' | 6 |
| 2 | M | 2 | Transaction code | Numeric | 82: Debit advice<br>83: Credit advice |
| 3 | M | 8 | Receiving DFI Identification | TTTTAAAA | US assigned ABA for One of the EGO's |
| 4 | M | 1 | Check Digit | Numeric | Corresponding check digit to field 3, |
| 5 | R | 15 | DFI Account Number | Alphanumeric | Blank |
| 6 | M | 12 | Amount | $$$$$$$$$$¢¢ | Amount of settlement |
| 7 | M | 9 | Advice Routing Number | Numeric | Eurogiro member's US correspondent ABA |
| 8 | O | 5 | File Identification | Alphanumeric | File date and modifier for which settlement represents |
| 9 | O | 1 | ACH Operator Data | Alphanumeric | 0 |
| 10 | R | 22 | Individual Name | Alphanumeric | Name of US Correspondent Bank |
| 11 | O | 2 | Discretionary Data | Alphanumeric | 00 |
| 12 | M | 1 | Addenda Record Indicator | Numeric | 0<br>There is no AR! |
| 13 | M | 8 | Routing Number of ACH Operator | TTTTAAAA | |
| 14 | M | 3 | Julian Date on Which this Advice is Created | Numeric | Julian date advice was created |
| 15 | M | 4 | Sequence Number Within Batch | Numeric | Sequential number within batch; always starting with 0001 |

FIGURE 14D - Advice Company /Batch Control Record – NACHA TO SWIFT

| ADV BCR Field | | | Description | Contents | Values to Eurogiro |
|---|---|---|---|---|---|
| No | Req | Length | | | |
| 1 | M | 1 | Record type code | '8' | 8 |
| 2 | M | 3 | Service Class Code | Numeric | Always '280' |
| 3 | M | 6 | Entry/Addenda Count | Numeric | Number of entry '6' and addenda '7' records within the batch |
| 4 | M | 10 | Entry Hash | Numeric | Sum of all Receiving DFI numbers (field 3 in 6 record) with the batch |
| 5 | M | 12 | Total Debit Entry Dollar Amount | $$$$$$$$$$¢¢ | Sum of all debit dollar values (82 entry type) |
| 6 | M | 12 | Total Credit Entry Dollar Amount | $$$$$$$$$$¢¢ | Sum of all credit dollar values (83 entry type) |
| 7 | O | 35 | ACH Operator Data | Alphanumeric | blank |
| 8 | M | 8 | Originating DFI Identification | TTTTAAAA | |
| 9 | M | 7 | Batch Number | Numeric | Same as field 13 in BHR |

FIGURE 14E - Advice File Control Record – NACHA to SWIFT

| FCR Field | | | Description | Contents | Values to Eurogiro |
|---|---|---|---|---|---|
| No | Req. | Length | | | |
| 1 | M | 1 | Record type code | '9' | '9' |
| 2 | M | 6 | Batch Count | Numeric | # Batches |
| 3 | M | 6 | Block Count | Numeric | # blocks |
| 4 | M | 8 | Entry / Addenda count | Numeric | # entries + # addenda |
| 5 | M | 10 | Entry Hash | Numeric | Hashed value |
| 6 | M | 12 | Total debit entry dollar amount | $$$$$$$$$$cc | Total amount of 82's |
| 7 | M | 12 | Total credit entry dollar amount | $$$$$$$$$$cc | Total amount of 83's |
| 8 | NA | 39 | Reserved | Blank | Blank |

FIGURE 14F - MT910 - SWIFT Basic Header

|   | BH Tag | Field Name | Content / Options |
|---|---|---|---|
| M |   | Application Identifier | F |
| M |   | Data Unit | 01 |
| M |   | Receiver address (BIC) | 12a |
| M |   | Dummy | 0000 |
| M |   | Output Sequence Number | 6!n |

FIGURE 14G - MT910 - SWIFT Application Header

|   | AH Tag | Field Name | Content / Options |
|---|---|---|---|
| M |   | Output Identifier | O |
| M |   | Message Type | 198 |
| M |   | Input time (from sender) | 4n |
| M |   | MIR<br>Input date<br>Senders address (BIC)<br>Dummy<br>Input sequence number | <br>6n<br>12a<br>0000<br>6n |
| M |   | Output date | 6n |
| M |   | Output time (receiver's local) | 4n |
| M |   | Message priority | ('N'|'U') |

FIGURE 14H - MT910 - SWIFT User Header

|   | UH Tag | Field Name | Content / Options |
|---|---|---|---|
| M | 108 | Reference Number | 16x |
| M | 903 | Product Code | '00' |

FIGURE 14I - MT910 - SWIFT Text Block

|   | TB Tag | Field Name | Content / Options |
|---|---|---|---|
| M | 20 | Senders reference number | 16x |
| M | 21 | Related reference (field 20 of original message) | 16x |
| O/M | 25 | Account identification that has been credited | 35x |
| M | 32A | Value Date, Currency Code, Amount | 6n3a15no |
| M | 52A | Ordering institution | 6!a2!c |
| O | 56D | Intermediary. Identifies the financial institution from which the Sender received the funds. | 35x |

FIGURE 14J - MT910 - SWIFT Trailer

|   | Tag | Field Name | Content / Options |
|---|---|---|---|
| M | NOM | Number of Messages | 5n |
| M | TOT | Total of Amounts | 18no |
| M | PDF | Possible Duplicate File | ('0'|'1') |
| O | PDE | Possible Duplicate Emission | 6n |
| M | MAC | Message Authentication Code | 8h |

METHOD AND SYSTEM FOR CONDUCTING INTERNATIONAL ELECTRONIC FINANCIAL TRANSACTIONS

RELATED PATENT APPLICATIONS

This patent application claims priority to the provisional patent application entitled "Method and System for International Electronic Payment Delivery" filed on Jul. 3, 2003 and assigned U.S. Application Ser. No. 60/484,958. Applicants hereby incorporate by reference the full disclosure of U.S. application Ser. No. 60/484,958.

FIELD OF THE INVENTION

The present invention relates to international electronic financial transactions and more specifically to a method and system for accomplishing electronic financial transactions between financial systems that use different electronic file formats.

BACKGROUND OF THE INVENTION

Generally there are three different methods for completing international transactions between financial institutions. The first method relies on pre-existing relationships between banks in different countries. Typically, large banks have relationships with correspondent banks in other countries. These large banks have established their own private processes for completing international transactions. The transactions completed using these correspondent bank relationships are typically for a large amount and involve a relatively small volume of transactions. This method for completing international transactions can be expensive and is not generally available for high-volume, low-value transactions.

The second method for completing international transactions is with a check. Checks are relatively simple to use and can be written by anyone with a checking account at a financial institution. The disadvantage of checks is that they require manual processing that delays the time in which a transaction is completed and adds costs to the transaction. Currency conversions also add to the costs associated with checks.

The third method is generally referred to as a "wire transfer" from an account at one bank to an account at another foreign bank. Wire transfers are a form of electronic finds transfers ("EFTs") and are generally more accessible in that they are not limited to large banks that have relationships with correspondent foreign banks. However, wire transfers are generally costly, particularly where several intermediaries are involved in the transaction. Because a wire transfer is costly, it is not a cost-effective method for completing low-value, high-volume transactions.

Another form of EFT that is currently used domestically is known as direct payment or direct deposit instruments (hereinafter generally referred to as "direct payment"). A direct payment instrument is an electronically transmitted instruction to credit or debit a particular account. For example, a company can use direct payment to credit the accounts of its employees, customers, vendors, and beneficiaries. Direct payment instruments are becoming increasingly more popular as conventional payment methods, such as checks, decrease in popularity. Because the transaction is performed electronically, direct payment instruments offer convenience and reliability at a relatively low cost. The electronic system that supports direct payment instruments in the United States is referred to as the Automated Clearinghouse ("ACH").

The ACH is a nationwide system supported by several operators, including the Federal Reserve Banks and other institutions. The ACH network is governed by a set of rules, which are administered by the National Automated Clearinghouse Association ("NACHA"). The ACH network provides for the clearing of generally small value, repetitive and one-time payments among banks that participate in the ACH network. Financial institutions collect transactions and package them in batched ACH files according to the NACHA rules for forwarding to other institutions via the ACH network.

Computer networks exist in other countries and regions of the world for processing different types of transactions among foreign banks. For example, many European countries have their own domestic EFT systems for low-value transactions. Another communication network that supports the processing of certain types of payments among financial institutions in different European countries is called the Eurogiro network. The types of payment services available with the Eurogiro network include standard account payments, check payments, and urgent cash payments such as wire transfers.

Currently, the Eurogiro network is also connected to financial networks in Asia, Africa, and the U.S. However, these transactions are completed via inefficient inter-continental connections such as correspondent banking payments or wire transfers. One of the primary inefficiencies in international EFTs concerns the formats of the electronic files used to process the transactions. For example, the Eurogiro network generally uses an electronic file format called SWIFT. However, financial networks and payment systems in other countries and regions use other types of electronic file formats to process transactions. These different formats complicate the processing of international transactions. Originating and completing international transactions often requires manual steps performed by bank employees which slows down the processing and adds costs to the transaction. Slower processing also adds uncertainty as to when transactions are settled.

In view of the increasing number of international EFTs, there is a need for an efficient method for processing large volumes of low-value transactions by systems using different electronic file formats. Specifically, what is needed is a method for automatically converting between ACH file formats and the file formats of foreign financial networks. The conversion process should preserve the necessary data contained in the electronic file so that each financial network can complete the foreign transaction. The conversion process should also provide uniformity and certainty to international EFTs. There is a further need for a conversion process that can also communicate messages and other data associated with a transaction. Finally, a conversion process is needed that can automatically complete the settlement of the transaction.

SUMMARY OF THE INVENTION

The conversion processes and systems described herein provide solutions to the foregoing problems. Specifically, the conversion processes disclosed in the text and accompanying drawings support the conversion of electronic transaction files from one file format to another file format facilitating seamless processing of international electronic financial transactions. A gateway operator or institution in one country or region can transmit an electronic file containing transaction data to a converter software module. The converter software module converts the format of the file from the format used in the first country or region to a second format used in the country or region to which the file is being transmitted. The converter software module can also convert and transmit other files comprising data associated with the electronic transaction. The associated data can be used to manage records of electronic financial transactions and to settle the transactions.

In one aspect, the converter software module can receive a NACHA formatted transaction file comprising transaction data from a gateway operator in a first country. The converter software module can convert the NACHA formatted transaction file to a SWIFT formatted transaction file and transmit the SWIFT formatted transaction file to a gateway operator in a second country. The converter software module can also receive a NACHA formatted advice file comprising settlement data from a gateway operator in the first country. The converter software module can convert the NACHA formatted advice file to a SWIFT formatted advice file and transmit the SWIFT formatted advice file to a gateway operator in the second country. A receiving institution can use the SWIFT formatted transaction file and the SWIFT formatted advice file to reconcile settlement of the transaction identified by the data in the files.

In another aspect, the converter software module can receive a SWIFT formatted transaction file comprising transaction data from a gateway operator in a first country. The SWIFT formatted transaction file can be transmitted to the gateway operator from an originating financial institution. The converter software module can convert the SWIFT formatted transaction file to a NACHA formatted transaction file and transmit the NACHA formatted transaction file to a gateway operator in a second country. The converter software module can also receive a NACHA formatted advice file from the gateway operator in the second country. The NACHA formatted advice file comprises settlement data associated with the transaction received from the originating financial institution.

In yet another aspect, the converter software module can operate on a computing device coupled to a U.S. gateway operator and a European gateway operator. The U.S. gateway operator and the European gateway operator are coupled to financial institutions in their respective regions. The converter software module can receive a file in either NACHA format or SWIFT format from the U.S. or European gateway operator, respectively. The converter software module can convert files either from NACHA to SWIFT format or from SWIFT to NACHA format and transmit the converted file to the destination gateway. The destination gateway can forward the converted file to a receiving financial institution in the U.S. or Europe.

The aspects of the present invention may be more clearly understood and appreciated from a review of the following detailed description of the disclosed embodiments and by reference to the drawings and claims.

BRIEF DESCRIPTION OF THE DRAWINGS

FIGS. 9A through 9K are tables illustrating representative file formats for SWIFT and NACHA files associated with a forward payment from Europe to the U.S. in accordance with an exemplary embodiment of the present invention.

FIGS. 10A through 10L are tables illustrating representative file formats for SWIFT and NACHA files associated with a return from the U.S. to Europe in accordance with an exemplary embodiment of the present invention.

FIGS. 11A through 11F are tables illustrating representative file formats for SWIFT and NACHA files associated with a rejection from the U.S. to Europe in accordance with an exemplary embodiment of the present invention.

FIGS. 12A through 12K are tables illustrating representative file formats for SWIFT and NACHA files associated with a forward payment from the U.S. to Europe in accordance with an exemplary embodiment of the present invention.

FIGS. 13A through 13L are tables illustrating representative file formats for SWIFT and NACHA files associated with a return from Europe to the U.S. in accordance with an exemplary embodiment of the present invention.

FIGS. 14A through 14J are tables illustrating representative file formats for SWIFT and NACHA files associated with an advice file transmitted from the U.S. to Europe in accordance with an exemplary embodiment of the present invention.

DETAILED DESCRIPTION OF THE EXEMPLARY EMBODIMENTS

Figure 1:
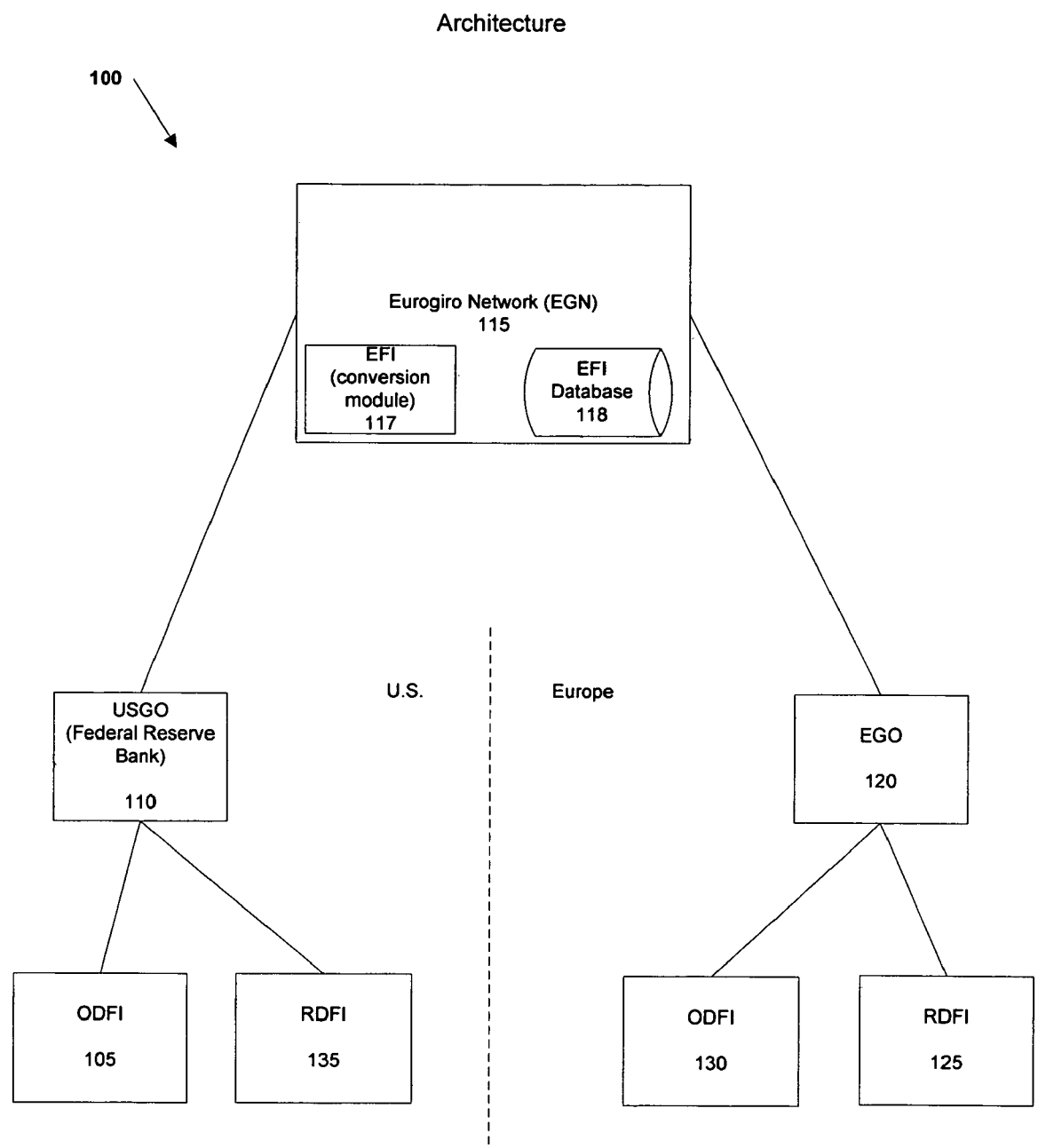
FIG. 1 is a block diagram illustrating a representative operating environment for an exemplary embodiment of the present invention.

The exemplary embodiments of the present invention support the completion of electronic financial transactions. Specifically, a conversion process is described that facilitates the exchange of electronic files containing financial transaction data. The conversion process allows clearinghouse systems for electronic transactions to communicate and share transaction information despite different format conventions. In the exemplary embodiments described herein, a converter software module can receive electronic files in a first format containing transaction data. The converter software module can transfer the file in the first format to a file in a second format and transmit the converted file to a financial institution. Conversely, the converter software module can also receive a file in the second file format from a financial institution and convert that file to the first format for receipt by another financial institution. The converter software module also supports the conversion and transmittal of other electronic files containing settlement data associated with a transaction file.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description that follows is represented largely in terms of processes and symbolic representations of operations in a distributed computing environment by conventional computer components, which can include database servers, application servers, mail servers, routers, security devices, firewalls, clients, workstations, memory storage devices, display devices and input devices. Each of these conventional distributed computing components is accessible via a communications network, such as a wide area network or local area network.

The present invention also includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and the preferred operating environment will be described.

FIG. 1 illustrates an exemplary architecture 100 for completing an international financial transaction in the representative context of the United States and Europe. The architecture 100 represents various financial institutions involved in the completion of an international financial transaction and the computer systems they use to complete that transaction. Throughout the specification, the terms "bank" and "financial institution" are used interchangeably to refer to any institution that processes, creates, transmits, or receives data associated with a financial transaction. Similarly, the term "gateway operator" refers to any institution that processes, creates, transmits, or receives data associated with a financial transaction. A gateway operator can also be a bank or other financial institution. Although the example of a forward payment transaction is discussed in greater detail within the specification, the term "financial transaction" includes, and is not limited to, a credit, a debit, or a rejected or returned transaction. Furthermore, a "financial transaction" can also include information associated with a transaction.

The originating depository financial institution ("ODFI") 105 receives transactions from its customers or other financial institutions and packages these transactions in electronic packets or files in a first format, such as the NACHA format. Under the NACHA format, files typically comprise batches of transactions that are generally referred to as items. Throughout this specification the term "file" includes NACHA and SWIFT formatted files as well as other more general electronic files and records that comprise data associated with a financial transaction. The NACHA format is a file format convention adopted by the Federal Reserve Banks and other financial institutions that participate in the ACH system in the U.S. The ODFI 105 submits the NACHA formatted files to the ACH system. The Federal Reserve Banks and the private financial institutions use the ACH system for clearing and settling electronic financial transactions.

The ACH system is represented in FIG. 1 as the U.S. Gateway Operator (USGO) 110. The USGO is merely one of many financial institutions within the ACH. In the example of an international transaction, as illustrated by the architecture 100 in FIG. 1, the USGO is the entity that forwards and receives international transaction data contained in NACHA formatted files. The USGO 110 transmits the NACHA formatted files to the EuroGiro Network 115. The EuroGiro Network 115 comprises computer systems coupled to various European financial institutions. The EuroGiro Network 115 comprises a EuroGiro-Fed Interface ("EFI"), also referred to as a converter software module 117, and an EFI database 118. The converter software module 117 converts the NACHA formatted transaction files to a second format, such as the SWIFT format used by European financial institutions. The converter software module 117 also stores a copy of the NACHA formatted files in the EFI database for later use. The converter software module 117 and the EFI database 118 are not required to be part of the Eurogiro Network 115. Alternative embodiments of the present invention can comprise a converter software module located in another country outside of the Eurogiro Network 115.

Once the transaction file is converted to the SWIFT format it is forwarded to the European Gateway Operator ("EGO") 120. The EGO 120 edits the SWIFT formatted transaction file, converts the amount of the transaction to a local currency, and converts the SWIFT formatted file to a local format. The EGO 120 then forwards the locally formatted transaction file to a receiving depository financial institution ("RDFI") 125. Unless the transaction file is rejected or returned, the RDFI 125 will credit or debit the account of its customer that participated in the original transaction forwarded from the ODFI 105.

The converter software module 117 also supports the conversion and transmittal of transaction files from Europe to the U.S. In such a transaction, the transaction file originates with an ODFI 130 in Europe in the SWIFT format. Alternatively, the ODFI 130 may create the transaction file in a local format that the EGO 120 can convert to SWIFT. The converter software module 117 converts the transaction file from SWIFT format to NACHA format. The NACHA formatted file can then be transmitted to an RDFI 135 in the U.S. via the USGO 110.

It should be understood by those skilled in the art that the architecture 100 is merely a representative example and that other computing systems and financial institutions can participate in the international financial transaction. Furthermore, the converter software module 117 can be associated with computer systems other than the Eurogiro Network 115. The process used for transactions originating from both the U.S. and Europe will be described in greater detail in the following flow diagrams.

Figure 2:
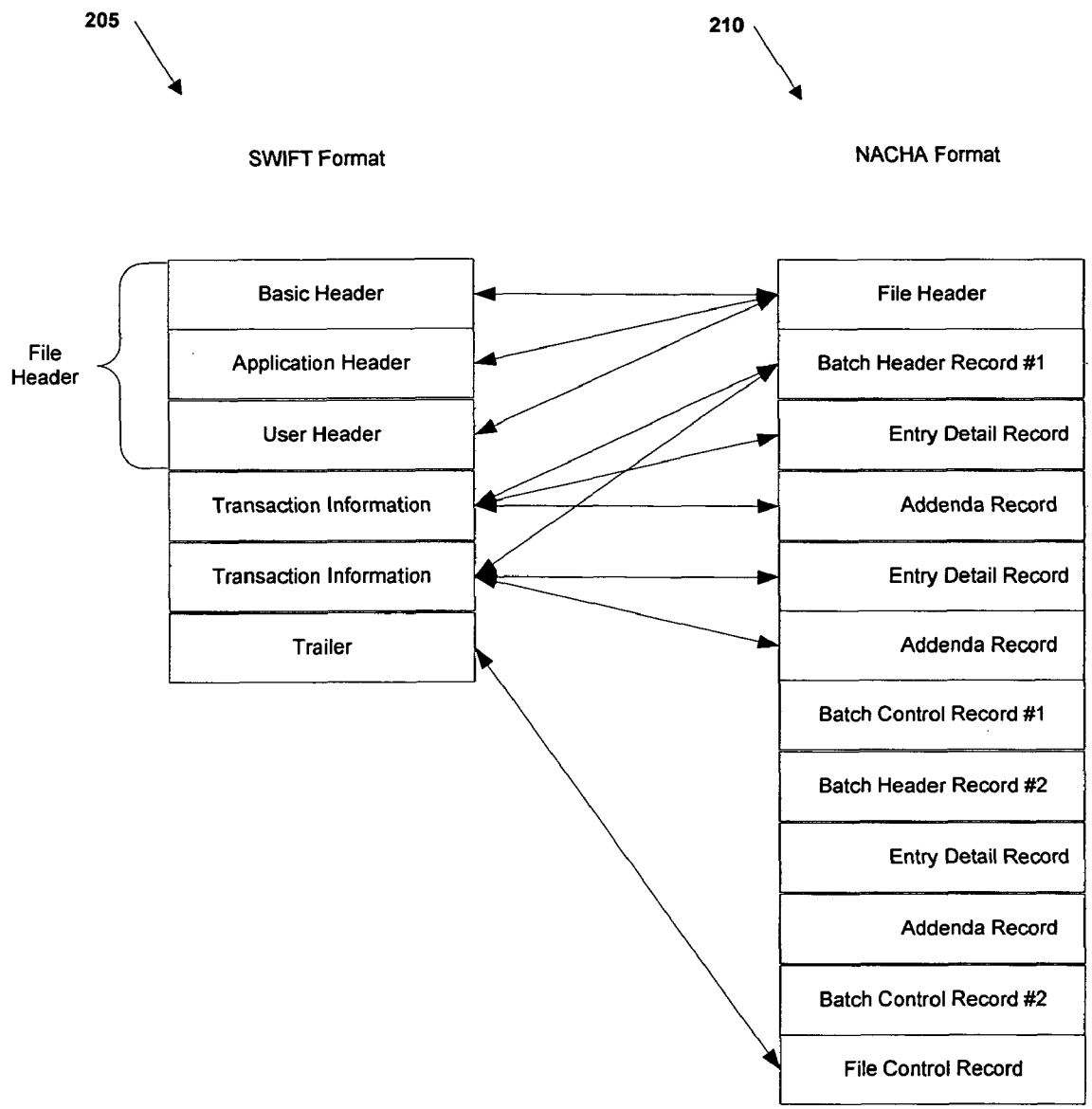
FIG. 2 is a block diagram illustrating representative SWIFT and NACHA file structures in accordance with an exemplary embodiment of the present invention.

FIG. 2 illustrates two exemplary file structures for the two file formats discussed previously. The ACH system in the U.S. employs the NACHA format illustrated in exemplary file structure 210. Many foreign financial institutions, such as those in Europe, use the SWIFT format represented by exemplary file structure 205. The file formats 205 and 210 are representative and minor variations of these formats may be implemented by those skilled in the art. The arrows shown in FIG. 2 illustrate how financial transaction data is organized during the conversion process performed by the converter software module 117.

For example, when the converter software module 117 converts a file from SWIFT format to NACHA format, it collects the data contained in the basic header, the application header, and the user header from the SWIFT formatted file and transfers this data to a single location known as the file header in the NACHA formatted file. The transaction data contained in a single field in the SWIFT formatted file is dispersed among the batch header record, the entry detail record, and the addenda record in the NACHA formatted file. Finally, the data in the trailer field in the SWIFT formatted file is transferred to the file control record in the NACHA formatted file. At a general level, the conversion process from NACHA format to SWIFT format is the reverse of the foregoing process.

As the exemplary file structure suggests, the SWIFT file format 205 was originally intended to contain data for a single transaction. In contrast, the NACHA formatted file 210 was originally intended to contain transaction records for numerous transactions that could be processed in a batch processing approach. Nonetheless neither file format is limited to its original intended purpose. The NACHA formatted file can contain only a single transaction and the SWIFT formatted file, as implemented by Eurogiro, can contain data for multiple financial transactions. Exemplary file formats are illustrated in greater detail in FIGS. 9 through 14. The file formats illustrated in FIGS. 9 through 14 are merely one means for accomplishing the conversion process and those skilled in the art will recognize that other file formats can readily be adopted to accomplish the conversion process described herein.

Figure 3:
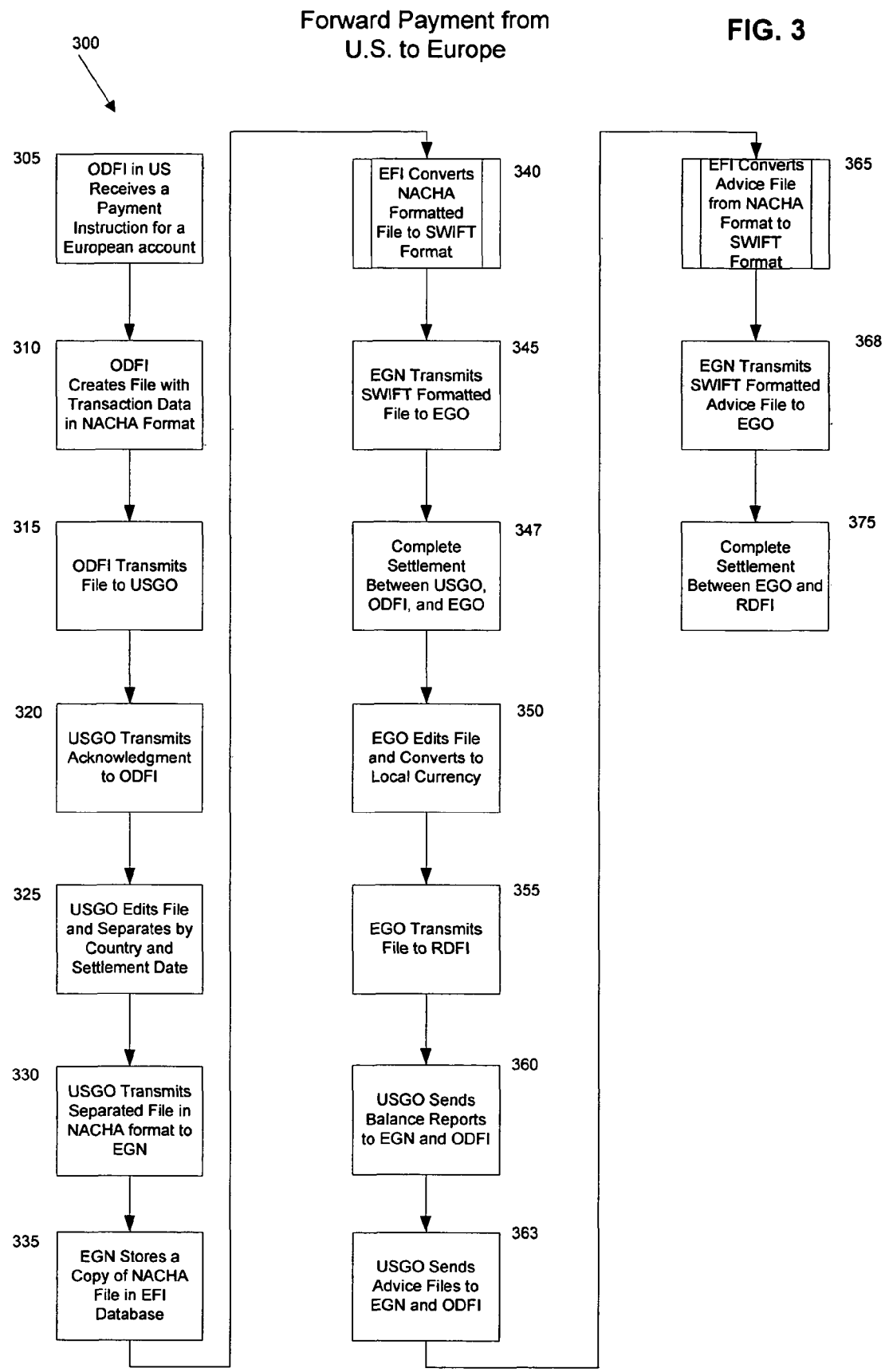
FIG. 3 is a flow diagram illustrating a forward payment process from the U.S. to Europe for an electronic financial transaction in accordance with an exemplary embodiment of the present invention.

FIG. 3 illustrates an exemplary process 300 for performing a forward payment process for an international transaction from a U.S. financial institution to a European financial institution. The exemplary process 300 refers to steps performed by the components illustrated in exemplary architecture 100. Those skilled in the art will understand that the steps illustrated in process 300 are only one example and in alternative embodiments of the invention process 300 may be performed in a somewhat different order or may eliminate certain steps entirely.

In step 305, the ODFI 105 in the United States receives a payment instruction from a customer involving an account at a European financial institution. The ODFI 105 creates an electronic file containing the transaction data for the payment instruction in step 310. The file containing the transaction data is in the NACHA format used by the participants in the ACH system. Examples of the transaction data in the NACHA format are illustrated in FIGS. 12A through 12K. The ODFI 105 then transmits the NACHA formatted file to the USGO 110 in step 315 and, in step 320, the USGO acknowledges receipt of the file.

The USGO 110 recognizes an identifier signifying that the file is to be transmitted to the EuroGiro Network 115. In step 325, the USGO 110 edits the file and separates transactions according to destination country, settlement date, forward items and return items. In step 330, the USGO 110 transmits an edited NACHA file to the EGN 115. The EGN 115 stores a copy of the NACHA formatted file in the EFI database 118 in step 335.

Step 340 represents an exemplary process whereby the converter software module 117 converts the transaction file from a NACHA format to a SWIFT format. The sub-processes performed in connection with the conversion process are illustrated in greater detail in FIG. 4. Furthermore, FIGS. 12A through 12K illustrate file formats associated with the conversion of a forward payment from the U.S. to Europe. The file formats illustrated in FIGS. 12A through 12K show the data that the ACH system provides when sending a transaction file for the representative transaction of a forward payment to Europe. The exemplary file formats show the data values that are taken from the NACHA formatted file and inserted into the various fields of the SWIFT formatted file. If the converter software module 117 is unable to convert a transaction file, it will be rejected and transmitted back to the USGO 110 for manual handling. The term "reject" is generally used for files that cannot be processed because of erroneous data or an incorrect file format. In contrast, a "returned" file, as described in greater detail in connection with FIGS. 5 and 8, comprises a transaction that cannot be completed because, for example, an account is closed or has insufficient funds.

In step 345, the EGN 115 transmits the file that has been converted to SWIFT format to the EGO 120. If the EGO 120 is unable to process a file that has been converted to SWIFT format, the EGO will reject the transaction file. After the SWIFT formatted file is transmitted to the EGO 120, the USGO 110 settles the transaction with the ODFI 105 and the EGO 120 in step 347.

In step 350, the EGO 120 edits the SWIFT file and converts the amount of the transaction to a local currency. The EGO 120 may also convert the SWIFT file to a local file format for receipt by the RDFI 125. In step 355, the EGO 120 transmits the converted file to the RDFI 125. The transmission to the RDFI 125 can be accomplished using an electronic financial transaction system local to the RDFI 125. In step 360, the USGO 110 sends balance reports to the EGN 115 and the ODFI 105. Balance reports contain summaries of the file traffic between the different financial institutions and assists those institutions in keeping accurate records. In step 363, the USGO also sends an advice file to the EGN 115 and the ODFI 105. The advice file contains settlement information for each transaction. For example, in the context of a forward payment transaction, the advice file would reflect the settlement amount of the forward payment that was sent from the ODFI to the EGO and the settlement date.

As with the original transaction file, the converter software module 117 converts the advice file from the NACHA format to the SWIFT format in step 365. The conversion process represented in step 365 is illustrated in greater detail in FIG. 4. Exemplary format tables for the conversion of an advice file from NACHA format to SWIFT format are illustrated in FIGS. 14A through 14J. The SWIFT formatted advice file is transferred from the EGN 115 to the EGO 120 in step 368. In step 375, the EGO 120 uses the converted transaction file and converted advice file to complete the settlement of the transaction with the RDFI 125.

Figure 4:
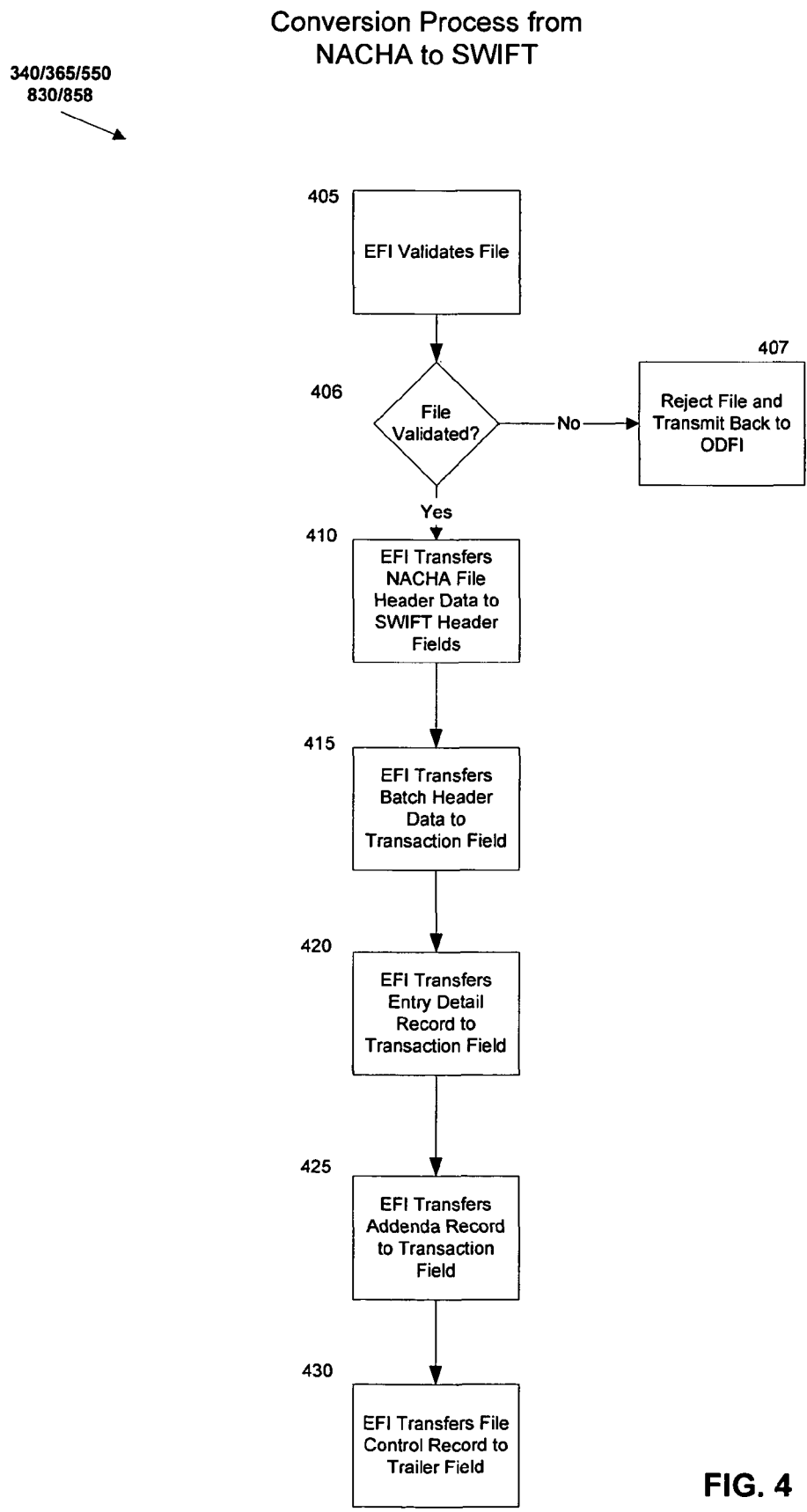
FIG. 4 is a flow diagram illustrating a process for converting a NACHA formatted file to a SWIFT formatted file in accordance with an exemplary embodiment of the present invention.

FIG. 4 illustrates an exemplary process for performing the conversion process using the converter software module 117. The conversion process from NACHA format to SWIFT format is illustrated in steps 340 and 365 of FIG. 3, step 550 of FIG. 5, and steps 830 and 858 of FIG. 8. The data that is transferred in the conversion process from NACHA format to SWIFT format is illustrated in greater detail in the exemplary file format tables in FIGS. 10A through 10L, 12A through 12K, and 14A through 14J.

In step 405, the converter software module 117 validates the NACHA file. If the converter software module 117 is unable to validate the NACHA file in step 407, the file will be rejected and returned to the financial institution from which it originated. Assuming the NACHA file is validated, in step 410, the converter software module 117 transfers the NACHA file header data to the SWIFT basic header, application header, and user header fields. The NACHA formatted file typically contains only one file header. The fields that comprise the NACHA file format and the SWIFT file format are illustrated in the exemplary file structures illustrated in FIG. 2.

In step 415, the converter software module 117 transfers the batch header data for one or more transactions to the transaction information field in the SWIFT formatted file. The batch header data generally contains one or more transactions for a specific customer. The entry detail record and the addenda record in the NACHA formatted file are also placed in the transaction information field in the SWIFT formatted file in steps 420 and 425. Each transaction typically has one entry detail record and one addenda record. Lastly, in step 430, the converter software module 117 transfers the control record indicating the end of the file to the trailer field in the SWIFT formatted file. It should be understood by those skilled in the art that the exemplary process illustrated in FIG. 4 may be performed in a different sequence and certain steps may be combined or eliminated.

Figure 5:
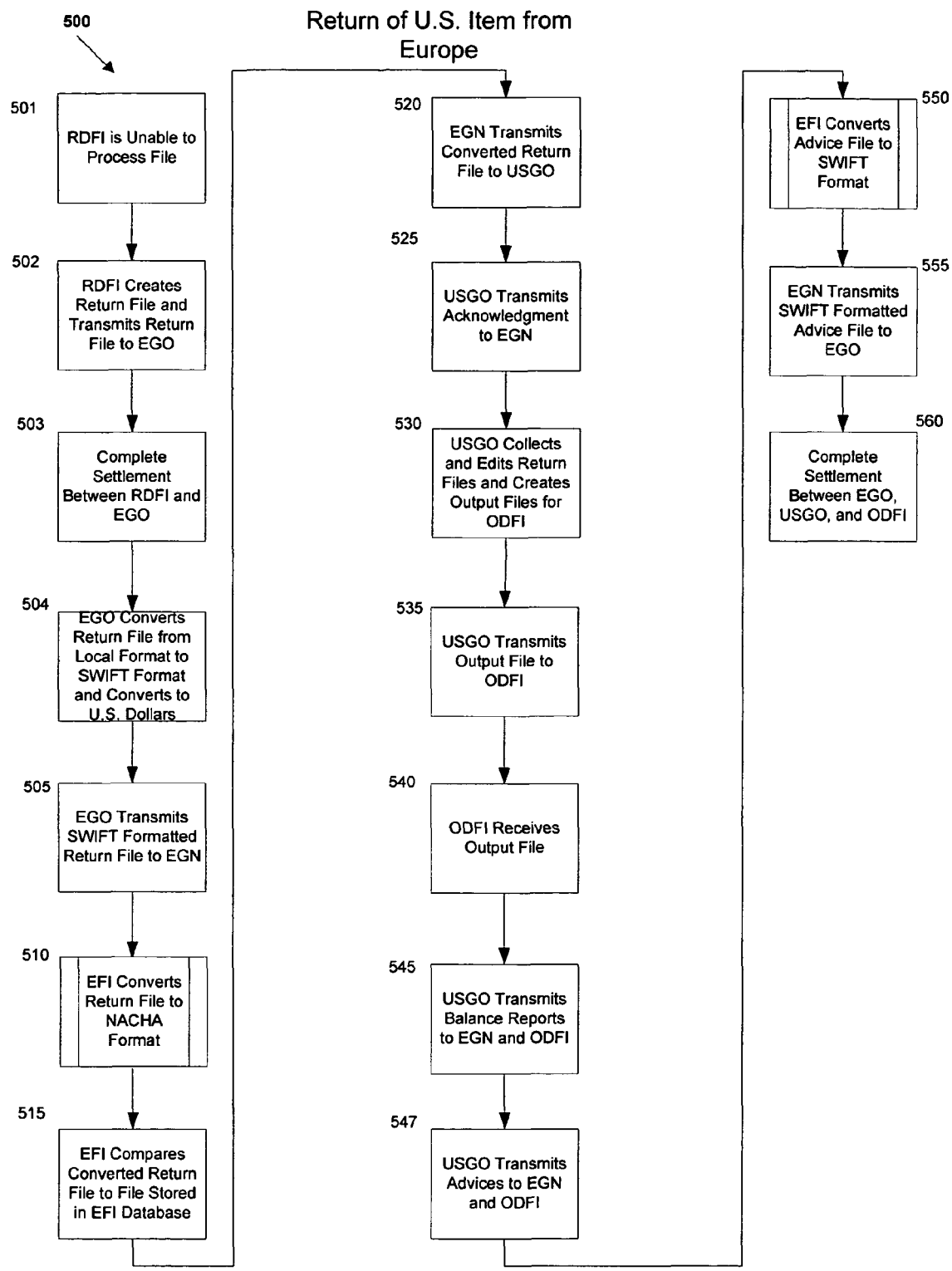
FIG. 5 is a flow diagram illustrating a return process from Europe to the U.S. for an electronic financial transaction in accordance with an exemplary embodiment of the present invention.

Referring to FIG. 5, an exemplary process 500 for the return of a U.S. file from Europe is illustrated. A return typically occurs when the EGO 120 or the RDFI 125 is unable to process a transaction in the converted SWIFT file because an account lacks sufficient funds or is closed. In step 501, the RDFI 125 in Europe receives a file in a local format convention that it is unable to process. The RDFI 125 creates a return file and transmits the return file to the EGO 120 in step 502. The EGO 120 and RDFI 125 typically complete settlement of the transaction at step 503. While FIG. 5 and the other figures described herein illustrate settlement occurring at discrete points in time, those skilled in the art understand that settlement of a transaction typically involves several steps that occur over a period of time. For example, a financial institution can record a transaction at one point in time, but the transfer of finds can occur at a later point in time. The processes described herein are merely representative and the steps of each exemplary process need not necessarily occur in the described sequence.

The EGO 120 converts the locally formatted file to a SWIFT formatted file and converts the currency to U.S. dollars in step 504. In step 505, the EGO 120 transmits the SWIFT formatted return file to the EGN 115. If the EGO was unable to process the SWIFT formatted file, it typically would not have been forwarded to the RDFI 125 and the return process would begin at step 505.

In step 510, the converter software module 117 converts the return file from SWIFT format to NACHA format. The process for converting the SWIFT formatted file to the NACHA format is illustrated in greater detail in FIG. 7. In step 515, the converter software module 117 compares the converted return file to the NACHA formatted file previously stored in the EFI database 118 in step 335. The stored NACHA formatted file contains the data transmitted by the USGO 110 during the initial forward payment process 300. The comparison step is used to retrieve additional data which may have been lost during the conversion processes.

In step 520, the EGN 115 transmits the converted return file to the USGO 110 and the USGO 110 transmits an acknowledgement to the EGN 115 in step 525. The USGO 110 periodically collects returned files received from the EGN 115 and creates output return files for transmitting to various ODFIs 105 as illustrated in step 530. The output return files are typically organized according to each RDFI 125. In steps 535 and 540, the ODFI 105 that originally transmitted the transaction for the representative example of a forward payment illustrated in FIG. 3 receives the output return files from the USGO 110. In steps 545 and 547, the USGO 110 transmits the balance reports and the advice files to the EGN 115 and the ODFI 105. The financial institutions use the balance reports to manage the file traffic and to ensure their records are accurate. The advice files contain settlement data including the timing for the settlement of the transaction. In steps 550 and 555 the converter software module 117 converts the advice file to SWIFT format and the file is transmitted to the EGO 120. Lastly, in step 560, the EGO 120 settles the return transaction with the USGO 110 and the USGO 110 settles the return transaction with the ODFI 105.

Figure 6:
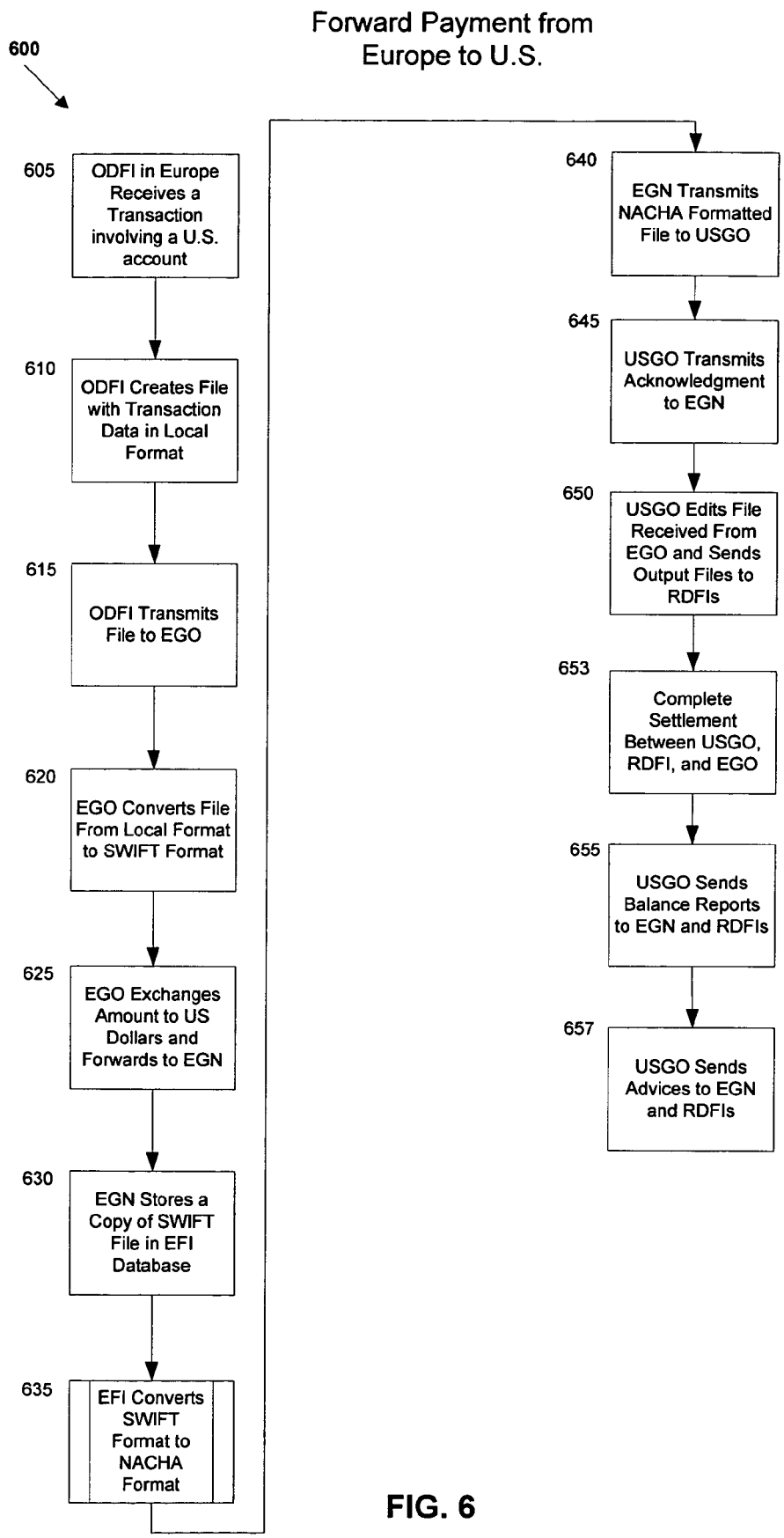
FIG. 6 is a flow diagram illustrating a forward payment process from Europe to the U.S. for an electronic financial transaction in accordance with an exemplary embodiment of the present invention.

FIG. 6 illustrates an exemplary process 600 for processing a forward payment from a European financial institution to a U.S. financial institution. Although the process for handling a transaction from Europe to the U.S. is similar to the process illustrated in FIG. 3, there are certain distinctions as shown in process 600. In step 605, the ODFI 130 in Europe receives a payment instruction involving a U.S. account. The ODFI 130 creates a file with transaction data in the local format in step 610 and transmits the transaction file in a local format to the EGO 120 in step 615. In steps 620 and 625 the EGO 120 converts the file from a local format to the SWIFT format and performs the necessary exchange on the transaction amount to U.S. dollars. In alternative embodiments of the invention the ODFI 130 in Europe can use the SWIFT format instead of a local format making the format conversion in step 620 unnecessary. The EGN 115 receives the SWIFT formatted file and stores a copy of the file in the EFI database 118 in step 630. The stored copy of the SWIFT formatted file can be used later to verify records and to process any returned transactions.

In step 635, the converter software module 117 converts the SWIFT formatted file to NACHA format. An exemplary process for performing the conversion from SWIFT to NACHA format is illustrated in greater detail in FIG. 7. Representative file formats containing the data that is transferred from the SWIFT format to the NACHA format are illustrated in FIGS. 9A through 9K. In steps 640 and 645 the USGO 110 receives the NACHA formatted file from the EGN 115 and responds with an acknowledgement. The USGO 110 collects NACHA formatted files from financial institutions within the ACH system as well as foreign financial institutions. The USGO 110 uses the adopted NACHA format to organize and route the transaction files to the appropriate financial institutions in the U.S. In step 650, the USGO 110 edits the NACHA formatted file received from EGO 120 and sends the output files to the appropriate RDFI 135.

In step 653, the USGO 110 settles the transaction contained in the output files with the RDFI 135 and the EGO 120. The USGO 110 transmits balance reports and advice files to the EGN 115 and the RDFI 135 in steps 655 and 657. In the embodiment illustrated in FIG. 6 of a forward payment from Europe to the U.S., the EGO 120 typically does not receive converted advice files from the EGN 115. Because the forward payment originated with the EGO 120, EGOs typically do not require receipt of a debit settlement item. In alternative embodiments of the invention, such as a debit item that originates in Europe, the EGO 120 may request to receive a credit settlement item. In those instances where the EGO 120 requires receipt of the settlement item, the converter software module 117 converts the advice file from NACHA to SWIFT format and the converted advice file is sent to the EGO 120. As in the previous conversion steps from NACHA format to SWIFT format, the NACHA to SWIFT conversion process is illustrated in greater detail in FIG. 4. Additionally, FIGS. 14A through 14J contain exemplary file format tables for the conversion of an advice file.

Figure 7:
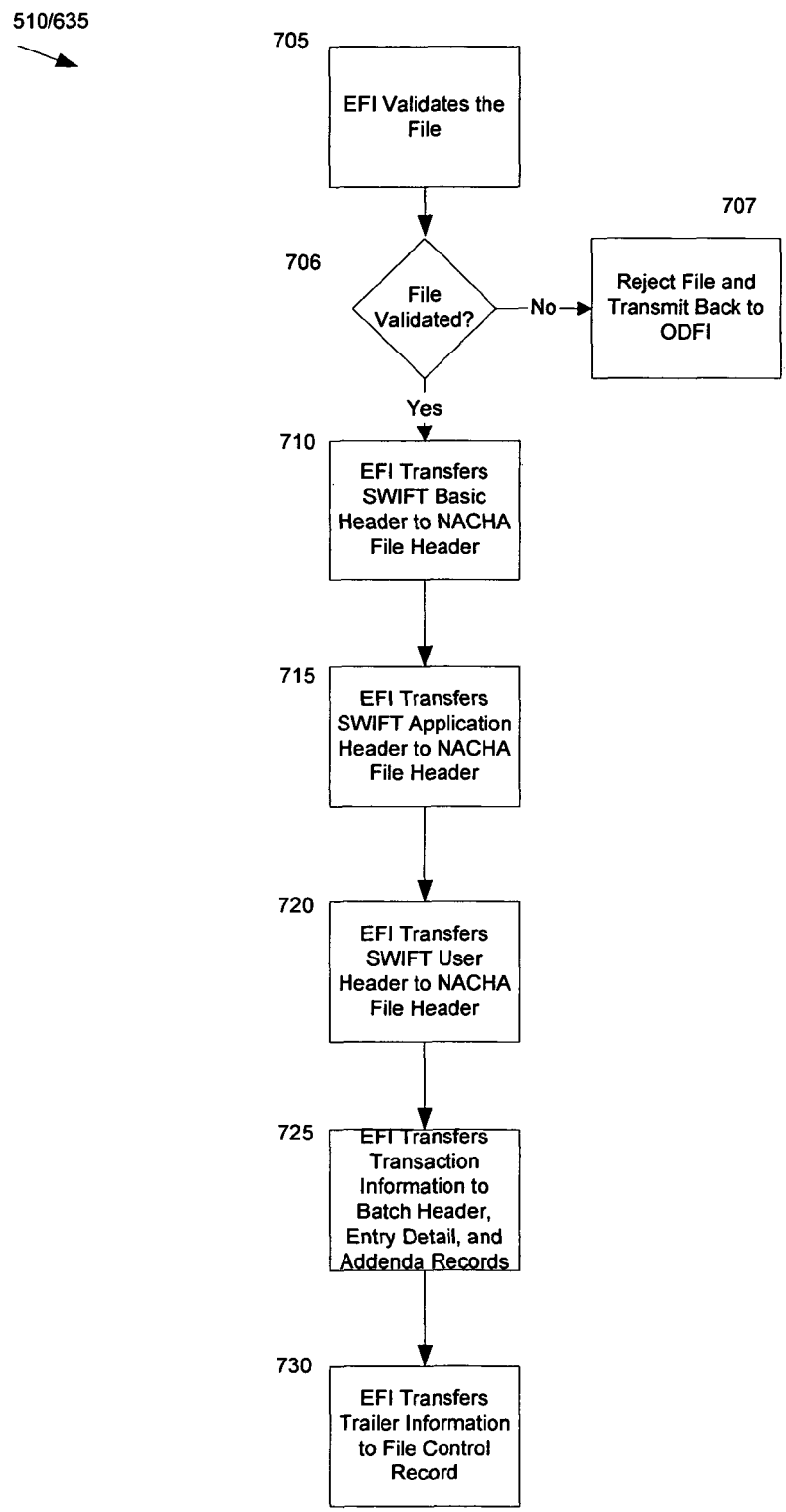
FIG. 7 is a flow diagram illustrating a process for converting a SWIFT formatted file to a NACHA formatted file in accordance with an exemplary embodiment of the present invention.

Referring to FIG. 7, an exemplary conversion process, as identified in steps 510 and 635, is illustrated. The exemplary process illustrated in FIG. 7 describes the conversion of an electronic file from SWIFT format to NACHA format. In step 705, the converter software module 117 validates the transaction file received from a gateway operating financial institution. If the converter software module 117 is unable to validate the file, it is rejected and transmitted back to the financial institution from which it was received. Assuming the validation process is completed, the converter software module 117 proceeds to transfer the data in the file from the SWIFT format to the NACHA format. Representative file formats are illustrated in greater detail in FIG. 2. Additionally, FIGS. 9A through 9K show the data that is transferred in accordance with an exemplary conversion process.

In step 710, the converter software module 117 transfers the header information in the SWIFT basic header to the NACHA file header. In steps 715 and 720, the converter software module 117 transfers the application header data and the user header data to the NACHA file header. Unlike the SWIFT file format which comprises three distinct file headers, the NACHA file format generally consists of a single file header. In step 725, the converter software module 117 transfers information for a particular transaction to the batch header field, the entry detail field and the addenda record field in the NACHA formatted file. In the NACHA format each transaction comprises an entry detail record and an addenda record. Furthermore, in the NACHA formatted file data for multiple transactions can be grouped into a batch with a header record and a control record. Lastly, in step 730, the converter software module 117 transfers the trailer information from the SWIFT formatted field to the file control record in the NACHA formatted file.

Figure 8:
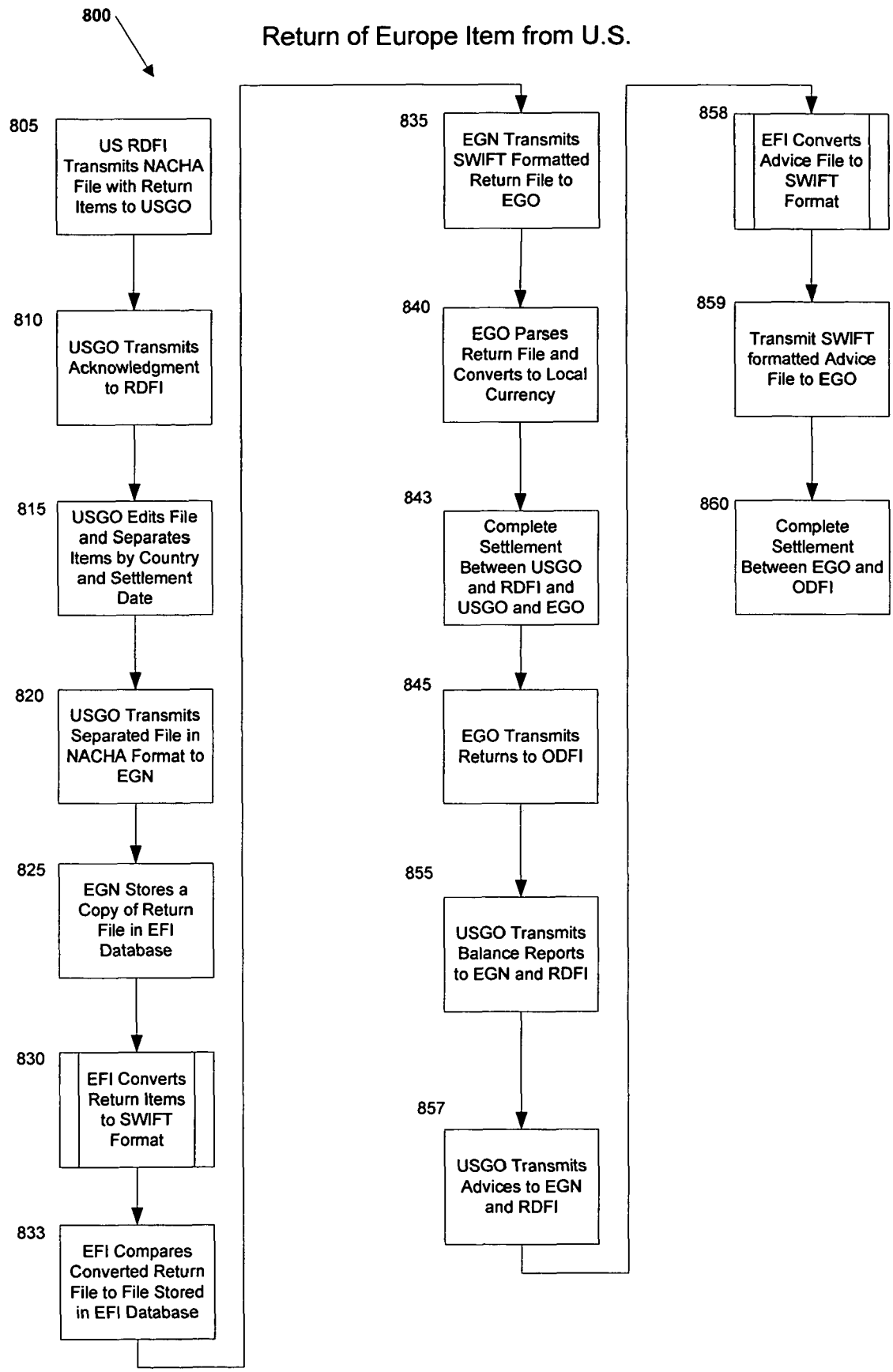
FIG. 8 is a flow diagram illustrating a return process from the U.S. to Europe for an electronic financial transaction in accordance with an exemplary embodiment of the present invention.

Exemplary process 800 illustrated in FIG. 8 describes the return of a financial transaction from a U.S. institution to a European financial institution. The return process 800 may occur when a transaction cannot be completed such as the forward payment transaction illustrated in process 600. For example, if a party no longer maintains an account at the RDFI, the RDFI will not be able to complete the transaction and will transmit a return item to the originating institution.

Referring now to the exemplary process 800, in step 805, the RDFI in the U.S. transmits a NACHA file with the return transaction to the USGO 110. The USGO 110 transmits an acknowledgement to the RDFI 135 and edits the file and separates return items on a country and settlement date basis in steps 810 and 815. In step 820, the USGO 110 transmits separated files to the EGN 115. A copy of received file is stored in the EFI database 118 in step 825 and the converter software module 117 proceeds to convert the file to SWIFT format in step 830. The conversion process is illustrated in greater detail in FIG. 7. Exemplary file format tables illustrating the data that is typically transferred in a conversion process for a return file from the U.S. to Europe are contained in FIGS. 10A through 10L.

The EGN 115 also refers to the file that was stored in the EFI database 118 when the forward payment file was originally converted in step 833. The stored file can be used to assemble additional data that may have been lost in the conversion process. In step 835, the EGN 115 transmits the SWIFT formatted return file to the EGO 120. The EGO 120 edits the return file and converts the transaction amounts to the local currency of the originating European financial institution in step 840. At this point, the USGO 110 can complete settlement of the transaction with the RDFI 135 and the EGO 120. The EGO 120 also transmits the return file to the ODFI 130 in Europe in step 845.

Completion of the return transaction is accomplished with the transfer of the balance and advice files. In steps 855 and 857, the USGO will transmit balance reports to the EGN 115 and the balance report and advice file to the RDFI 135 in the U.S. As illustrated in FIG. 4, the advice file is converted from NACHA format to SWIFT format and transmitted to the EGO 120 in steps 858 and 859. Lastly, in step 860 of exemplary process 800, the EGO 120 in Europe settles the transaction with the ODFI 130, generally via the process employed by the local electronic financial transaction system.

In conclusion, the present invention enables and supports communication among different financial transaction systems located in different regions of the world. The systems and processes described herein allow for the conversion of financial transaction files from a first format to a second format. For example, the first format can be used in a first geographical region and the second format can be used in a second geographical region. The conversion processes also support the transfer of data associated with the financial transactions enabling settlement of the transaction without manual steps. The conversion processes allow international financial transactions to be completed more quickly and with greater certainty as to the time period in which they will be completed.

It will be appreciated that the present invention fulfills the needs of the prior art described herein and meets the above-stated objectives. While there has been shown and described the preferred embodiment of the invention, it will be evident to those skilled in the art that various modifications and changes may be made thereto without departing from the spirit and the scope of the invention as set forth in the appended claims and equivalence thereof. It should be readily apparent that the components of the conversion module can be located in various local and remote locations of a distributed computing environment. Although the present invention has been described as operating with financial systems in the U.S. and Europe, it should be understood that the invention can be applied to other financial systems located throughout the world.

What is claimed is:

1. A computer-implemented method for performing an international financial transaction comprising the steps of:
   receiving a NACHA formatted transaction file comprising terms of the international financial transaction from a first gateway operator;
   converting, by at least one computer, the NACHA formatted transaction file to a SWIFT formatted transaction file;
   transmitting the SWIFT formatted transaction file to a second gateway operator;
   receiving a NACHA formatted advice file associated with the NACHA formatted transaction file from the first gateway operator, wherein the advice file comprises settlement data;
   converting, by the at least one computer, the NACHA formatted advice file to a SWIFT formatted advice file; and
   transmitting the SWIFT formatted advice file to the second gateway operator, whereby the SWIFT formatted transaction file and the SWIFT formatted advice file are used to reconcile settlement of the international financial transaction.

2. The computer-implemented method of claim 1, further comprising the step of storing a copy of the NACHA formatted transaction file in an electronic storage device.

3. The computer-implemented method of claim 1, further comprising the step of storing a copy of the NACHA formatted advice file in an electronic storage device.

4. The computer-implemented method of claim 1, wherein the advice file further comprises a settlement date.

5. The computer-implemented method of claim 1, wherein the step of converting the NACHA formatted transaction file to the SWIFT formatted transaction file comprises:
   transferring a NACHA file header to a SWIFT file header;
   transferring a NACHA batch header to a SWIFT transaction field;
   transferring a NACHA entry detail record to the SWIFT transaction field;
   transferring a NACHA addenda record to the SWIFT transaction field; and
   transferring a NACHA file control record to a SWIFT trailer field.

6. The computer-implemented method of claim 1, further comprising the step of sorting the NACHA formatted transaction file by a country destination indicator.

7. The computer-implemented method of claim 1, further comprising the step of sorting the NACHA formatted transaction file by a settlement date.

8. The computer-implemented method of claim 1, further comprising the step of converting a currency value contained in the SWIFT formatted transaction file to a local currency.

9. A computer-readable storage medium storing computer-executable instructions thereon that, when executed by at least one computer, direct the at least one computer to perform an international financial transaction comprising the steps of:
   receiving a NACHA formatted transaction file comprising terms of the international financial transaction from a first gateway operator;
   converting, by the at least one computer, the NACHA formatted transaction file to a SWIFT formatted transaction file;
   transmitting the SWIFT formatted transaction file to a second gateway operator;
   receiving a NACHA formatted advice file associated with the NACHA formatted transaction file from the first gateway operator, wherein the advice file comprises settlement data;
   converting, by the at least one computer, the NACHA formatted advice file to a SWIFT formatted advice file; and
   transmitting the SWIFT formatted advice file to the second gateway operator, whereby the SWIFT formatted transaction file and the SWIFT formatted advice file are used to reconcile settlement of the international financial transaction.

10. A computer-implemented method for performing an international financial transaction comprising the steps of:
    receiving a NACHA formatted transaction file comprising terms of the international financial transaction from a first financial institution;
    converting, by at least one computer, the NACHA formatted transaction file to a SWIFT formatted transaction file;
    transmitting the SWIFT formatted transaction file to a second financial institution; and
    receiving a settlement data file associated with the transaction file from the first financial institution.

11. The computer-implemented method of claim 10, further comprising the steps of:
    converting the settlement data file from NACHA format to a SWIFT formatted settlement data file; and
    transmitting the SWIFT formatted settlement data file to the second financial institution, whereby the SWIFT formatted transaction file and the SWIFT formatted settlement data file are used to reconcile settlement of the international financial transaction.

12. The computer-implemented method of claim 10, further comprising the step of storing a copy of the NACHA formatted transaction file in an electronic storage device.

13. The computer-implemented method of claim 10, wherein the step of converting the NACHA formatted transaction file to the SWIFT formatted transaction file comprises:
    transferring a NACHA file header to a SWIFT file header;
    transferring a NACHA batch header to a SWIFT transaction field;
    transferring a NACHA entry detail record to the SWIFT transaction field;
    transferring a NACHA addenda record to the SWIFT transaction field; and
    transferring a NACHA file control record to a SWIFT trailer field.

14. The computer-implemented method of claim 10, further comprising the step of sorting the NACHA formatted transaction file by a country destination indicator.

15. The computer-implemented method of claim 10, wherein at least one of the first financial institution and the second financial institution is a third party processor of financial transactions.

16. The computer-implemented method of claim 10, further comprising the step of storing a copy of the settlement file in an electronic storage device.

17. The computer-implemented method of claim 10, wherein the settlement file further comprises a settlement date.

18. The computer-implemented method of claim 10, further comprising the step of sorting the NACHA formatted transaction file by a settlement date.

19. The computer-implemented method of claim 10, further comprising the step of converting a currency value contained in the SWIFT formatted transaction file to a local currency.

20. A computer-readable storage medium storing computer-executable instructions thereon that, when executed by at least one computer, direct the at least one computer to perform an international financial transaction comprising the steps of:
    receiving a NACHA formatted transaction file comprising terms of the international financial transaction from a first financial institution;
    converting, by the at least one computer, the NACHA formatted transaction file to a SWIFT formatted transaction file;
    transmitting the SWIFT formatted transaction file to a second financial institution; and
    receiving a settlement data file associated with the transaction file from the first financial institution.

21. A computer-implemented method for performing an international financial transaction comprising the steps of:
    transmitting, by at least one computer, a NACHA formatted transaction file to a financial network for conversion to a SWIFT formatted transaction file and transmission of the SWIFT formatted transaction file to a foreign financial institution; and
    transmitting, by the at least one computer, a NACHA formatted advice file comprising settlement data to the financial network, wherein the advice file is associated with the NACHA formatted transaction file.

22. The computer-implemented method of claim 21, further comprising the step of receiving the NACHA formatted transaction file from an originating financial institution.

23. The computer-implemented method of claim 21, wherein the NACHA formatted advice file is converted to a SWIFT formatted advice file and transmitted to the foreign financial institution.

24. A computer-readable storage medium storing computer-executable instructions thereon that, when executed by at least one computer, direct the at least one computer to perform an international financial transaction comprising the steps of:
   transmitting, by the at least one computer, a NACHA formatted transaction file to a financial network for conversion to a SWIFT formatted transaction file and transmission of the SWIFT formatted transaction file to a foreign financial institution; and
   transmitting, by the at least one computer, a NACHA formatted advice file comprising settlement data to the financial network, wherein the advice file is associated with the NACHA formatted transaction file.

25. A computer-implemented method for performing an international financial transaction comprising the steps of:
   receiving a SWIFT formatted transaction file comprising terms of the international financial transaction from a first financial institution;
   converting, by at least one computer, the SWIFT formatted transaction file to a NACHA formatted transaction file;
   transmitting the NACHA formatted transaction file to a second financial institution; and
   receiving a settlement data file associated with the NACHA formatted transaction file from the first financial institution.

26. The computer-implemented method of claim 25, further comprising the steps of:
   converting the settlement data file from NACHA format to a SWIFT formatted settlement data file; and
   transmitting the SWIFT formatted settlement data file to the first financial institution, whereby the SWIFT formatted settlement data file is used to reconcile settlement of the international financial transaction.

27. The computer-implemented method of claim 25, further comprising the steps of:
   transferring a SWIFT basic header, a SWIFT application header, and a SWIFT user header to a NACHA file header;
   transferring a SWIFT transaction field to at least one of a NACHA batch header record, a NACHA entry detail record, and a NACHA addenda record; and
   transferring a SWIFT trailer field to a NACHA file control record.

28. The computer-implemented method of claim 25, wherein the settlement data file comprises a settlement date.

29. The computer-implemented method of claim 25, wherein the first financial institution is a European gateway operator and the second financial institution is a U.S. gateway operator.

30. A computer-readable storage medium storing computer-executable instructions thereon that, when executed by at least one computer, direct the at least one computer to perform an international financial transaction comprising the steps of:
   receiving a SWIFT formatted transaction file comprising terms of the international financial transaction from a first financial institution;
   converting, by the at least one computer, the SWIFT formatted transaction file to a NACHA formatted transaction file;
   transmitting the NACHA formatted transaction file to a second financial institution; and
   receiving a settlement data file associated with the NACHA formatted transaction file from the first financial institution.

31. A computer-implemented method for supporting a financial transaction comprising the steps of:
   receiving a transaction file having a first format and comprising data associated with the financial transaction from a first financial institution;
   converting, by at least one computer, the transaction file having the first format to a transaction file having a second format;
   transmitting the transaction file having the second format to a second financial institution;
   receiving from the first financial institution a settlement file having the first format and associated with the transaction file having the first format;
   converting, by the at least one computer, the settlement file having the first format to a settlement file having the second format; and
   transmitting the settlement file to the second financial institution to reconcile settlement of the transaction associated with the data comprising the transaction file.

32. The computer-implemented method of claim 31, further comprising the steps of:
   storing a copy of the transaction file having the first format in an electronic storage device; and
   storing a copy of the settlement file having the first format in the electronic storage device.

33. The computer-implemented method of claim 31, further comprising the step of sorting the transaction file having the first format by a destination.

34. The computer-implemented method of claim 31, further comprising the step of sorting the transaction file having the first format by a settlement date.

35. A computer-readable storage medium storing computer-executable instructions thereon that, when executed by at least one computer, direct the at least one computer to perform an international financial transaction comprising the steps of:
   receiving a transaction file having a first format and comprising data associated with the financial transaction from a first financial institution;
   converting, by the at least one computer, the transaction file having the first format to a transaction file having a second format;
   transmitting the transaction file having the second format to a second financial institution;
   receiving from the first financial institution a settlement file having the first format and associated with the transaction file having the first format;
   converting, by the at least one computer, the settlement file having the first format to a settlement file having the second format; and
   transmitting the settlement file to the second financial institution to reconcile settlement of the transaction associated with the data comprising the transaction file.

* * * * *